US009387624B2

(12) United States Patent
Yuyama

(10) Patent No.: US 9,387,624 B2
(45) Date of Patent: Jul. 12, 2016

(54) MEDICINE PACKING APPARATUS

(75) Inventor: Shoji Yuyama, Toyonaka (JP)

(73) Assignee: YUYAMA MFG. CO., LTD., Toyonaka-shi (JP)

( * ) Notice: Subject to any disclaimer, the term of this patent is extended or adjusted under 35 U.S.C. 154(b) by 628 days.

(21) Appl. No.: 13/702,559

(22) PCT Filed: Jun. 6, 2011

(86) PCT No.: PCT/JP2011/062893
§ 371 (c)(1),
(2), (4) Date: Dec. 6, 2012

(87) PCT Pub. No.: WO2011/155427
PCT Pub. Date: Dec. 15, 2011

(65) Prior Publication Data
US 2013/0081362 A1     Apr. 4, 2013

(30) Foreign Application Priority Data

Jun. 9, 2010  (JP) .................................. 2010-132143
Feb. 3, 2011  (JP) .................................. 2011-021963

(51) Int. Cl.
*B65B 1/04*      (2006.01)
*B29C 65/00*    (2006.01)
*B65B 5/10*      (2006.01)
(Continued)

(52) U.S. Cl.
CPC ............. *B29C 66/83413* (2013.01); *B65B 1/04* (2013.01); *B65B 5/103* (2013.01); *B65B 9/06* (2013.01); *B65B 51/28* (2013.01)

(58) Field of Classification Search
CPC . B65B 51/28; B65B 9/06–9/093; B65B 1/04; B65B 5/103; B29C 65/18; B29C 66/83413; B29C 66/83513; B29C 66/84121; B29C 66/849; B29C 66/934
USPC .............. 53/374.3–376.2, 555, 548, 550, 551
See application file for complete search history.

(56) References Cited

U.S. PATENT DOCUMENTS 3,074,214 A * 1/1963 Schneider et al. ............... 53/552
4,244,158 A * 1/1981 Nelham ........................... 53/412
(Continued)

FOREIGN PATENT DOCUMENTS

JP            49-97 A      1/1794
JP        3-102401 U      10/1991
(Continued)

*Primary Examiner* — Stephen F Gerrity
*Assistant Examiner* — Joshua Kotis
(74) *Attorney, Agent, or Firm* — Masuvalley & Partners

(57) ABSTRACT

A device for individually packaging medication comprises: a conveyance member for conveying a long packaging sheet, the packaging sheet being folded in two along the longitudinal direction thereof with a fold line disposed on the lower side; and a sealing member for sealing the packaging sheet. The sealing member is configured by integrating longitudinal and lateral sealing units. The longitudinal sealing unit being adapted to seal the edge of the packaging sheet, located on an opposite side of the fold line, and the lateral sealing unit being adapted to seal the packaging sheet at predetermined intervals in the longitudinal direction. The device further comprises: a support member for supporting the sealing member; and a control unit causing the sealing member to rotate idle while separating the longitudinal sealing unit from the packaging sheet and thereafter causing the longitudinal sealing unit to come into contact again with the packaging sheet.

18 Claims, 22 Drawing Sheets

(51) Int. Cl.
   *B65B 9/06*   (2012.01)
   *B65B 51/28*  (2006.01)

(56) References Cited

U.S. PATENT DOCUMENTS

| | | | | |
|---|---|---|---|---|
| 4,670,279 | A * | 6/1987 | Lesch | 426/410 |
| 5,678,393 | A * | 10/1997 | Yuyama et al. | 53/493 |
| 5,722,215 | A * | 3/1998 | Yuyama | 53/374.4 |
| 5,875,610 | A * | 3/1999 | Yuyama et al. | 53/75 |
| 6,164,038 | A * | 12/2000 | Kim | 53/374.4 |
| 6,598,377 | B2 * | 7/2003 | Takahashi | 53/550 |
| 6,647,702 | B1 * | 11/2003 | Kim | 53/568 |
| 7,121,397 | B2 * | 10/2006 | Yuyama et al. | 193/35 R |
| 7,607,911 | B2 * | 10/2009 | Sperry et al. | 425/373 |
| 8,887,479 | B2 * | 11/2014 | Koike et al. | 53/479 |
| 2008/0314002 | A1 * | 12/2008 | Yuyama | B65B 5/103 53/531 |
| 2011/0126489 | A1 * | 6/2011 | Kodama | B29C 65/18 53/374.4 |

FOREIGN PATENT DOCUMENTS

| | | |
|---|---|---|
| JP | 2942769 B | 6/1999 |
| JP | 2005-153985 A | 6/2005 |
| JP | 2008-62945 A | 3/2008 |

* cited by examiner

MEDICINE PACKING APPARATUS

This application is a national phase application under 35 U.S.C. §371 of International Application Serial No. PCT/JP2011/062893, filed on Jun. 6, 2011, and claims the priority under 35 U.S.C. §119 to Japan Patent Application No. 2010-132143, filed on Jun. 9, 2010 and Japan Patent Application No. 2011-021963, filed on Feb. 3, 2011, which are hereby expressly incorporated by reference in their entirety for all purposes.

TECHNICAL FIELD

This invention relates to a medicine packing apparatus for packaging medications such as tablets including capsules and powder.

BACKGROUND OF THE INVENTION

A variety of medicine packing apparatus are available for individually packaging each dose (single packet) of medications such as tablets or powders as per prescription, and for producing the packaged medicines continuously. Among them is a device using rolls wherein a long and narrow packaging sheet is pre-folded in two in the length direction. Generally, in the packaging unit of this type of medicine packing apparatus, the packaging sheet is fed from the roll, and following printing of necessary information with a printer, the packaging sheet is opened from the folded state, and a single dosage of medication is injected from the nozzle of a hopper inserted in this opening. Subsequently, the packaging sheet is sealed (heat sealed) in a heat sealing section so as to seal the medication.

For example, Patent document 1 discloses a medicine packing apparatus in which a pair of first rotating shafts is provided in a direction (hereafter referred to as transverse direction) perpendicular to the conveying direction of the packaging sheet, a transverse sealer for sealing the packaging sheet in transverse direction is provided in this pair of first rotating shafts, a second rotating shaft is provided coaxially with each first rotating shaft, and a longitudinal sealer for sealing the packaging sheet in the conveying direction (hereinafter referred to as vertical direction) is provided in this second rotating shaft so that sealing of the packages can be done at once. In this medicine packing apparatus, it is possible to adjust the size of the sachet as per the supply amount of medication by controlling the drive of the second rotating shaft provided with the longitudinal sealer, and adjusting a conveyance rate of the packaging sheet, for example, by varying a conveyance speed.

However, in the medicine packing apparatus disclosed in Patent document 1: Japanese Patent Publication No. 2942769, a heater is housed in the first rotating shaft, heat from this heater is conveyed to the transverse sealer of the first rotating shaft, and further conveyed from the first rotating shaft to the longitudinal sealer of the second rotating shaft, and therefore, there was a drawback of a large temperature difference between the transverse sealer and longitudinal sealer. There was also an issue such that, because the intervals at which the longitudinal sealer contacts the packaging sheet and the intervals at which the transverse sealer contacts the packaging sheet were different, the timings of heat transferred from the respective sheet sections to the packaging sheet were different, and a temperature difference between the transverse sealer and longitudinal sealer becomes all the more larger. Accordingly, it was necessary to use an expensive packaging sheet wherein a difference between the fusion temperature and heat resistance temperature is large, resulting in an increase in cost of the packaging sheet. In addition, there was also a drawback of the structure becoming complicated because the first rotating shaft provided with a heat sealing part and the second rotating shaft provided with a longitudinal sealer were driven by separate drive mechanisms.

SUMMARY OF THE INVENTION

The medicine packaging apparatus of the present invention, which is provided to solve the above-mentioned problems, has an objective of reducing the manufacturing cost of a packaging sheet by reducing a temperature difference between transverse sealer and longitudinal sealer, as well as to simplify the structure of the sealers and adjust the size of the dose sachet according to the supply quantity of medicine.

In order to solve the above-mentioned problems, the present invention provides a medicine packing apparatus, including
a conveyance member to convey a long packaging sheet with the sheet folded in two along the length direction and the fold line being positioned downwardly,
a medicine supplier to feed medicine from top onto the packaging sheet conveyed by the conveyance member, and
a pair of sealers that can hold the conveyed packaging sheet from both sides and heat-seal the sheet while rotating, and pack the supplied medicine by one package each, wherein
the sealers have a configuration wherein the longitudinal sealer that seals the edge part, which is opposite to the fold line of the packaging sheet, in the conveying direction, and a transverse sealer that seals the packaging sheet in a direction orthogonal to the conveying direction at a predetermined interval in the conveying direction are integrated, and
a support member that supports the pair of sealers such that at least one of the sealers is movable so as to come in contact with or move away from the packaging sheet, and
a controller that moves the sealers, and adjusts the sealing position sealed by a transverse sealer in the length direction by rotating at least the longitudinal sealer at a position retracted from the said packaging sheet,
are provided.

In the above configuration, with a simple configuration of just moving a sealer to a retracted position and rotating it, it is possible to change the sealing interval by the transverse sealer in a direction orthogonal to the conveying direction (transverse direction).

By integrating the longitudinal sealer and the transverse sealer, it becomes possible to eliminate the temperature difference between the sealers and to seal a packaging sheet at a desired temperature. Therefore, because a packaging sheet made of a cheaper material where a difference between fusion temperature and heat resistance temperature is small can be used, it becomes possible to reduce the manufacturing cost of a packaging sheet.

In addition, because of an integration of the sealers, it becomes possible to drive the sealers with a single drive mechanism, and therefore, the structure of the sealers can be simplified, and the sealing interval of the packaging sheet by the transverse sealer can be adjusted according to the supply quantity of a medicine.

With the help of the support member, it is possible to support at least one sealer such that it can move via both ends, or to support the sealer such that it can rotate around one end, and rotation is possible via the other end of the sealer.

It is preferable that, when adjusting the sealing positions by the transverse sealer, the controller sets the rotational direction in the retracted position of the sealer as a direction wherein the amount of rotation required for rotating the transverse sealer to a desired location is small.

With this configuration, the interval of sealing a packaging sheet by a transverse sealer can be quickly changed.

It is preferable that the controller stop the packaging sheet when moving away the longitudinal sealer.

With this configuration, it is possible to do away with unnecessary and wasteful drive.

It is preferable that the controller maintain the conveyance of the packaging sheet when moving the longitudinal sealer away from the sheet, and the range in which the packaging sheet is conveyed before attaching the longitudinal sealer to the packaging sheet again be in an area where vertical sealing is possible.

With this configuration, it is possible to continue the sealing operation and to achieve an efficient process without stopping the conveyance of the packaging sheet.

In order to make the range of conveying the packaging sheet to be in a region where vertical sealing can be performed, the controller may make the conveyance speed of the packaging sheet slower than at the time sealing when the longitudinal sealer is moved away from the sheet.

With the above-mentioned controller, in order to set the range of conveying the packaging sheet to be in the region where vertical sealing can be performed, when moving away the longitudinal sealer, the conveyance speed of the packaging sheet may be made slower than that at the time of sealing, or the sealer may be allowed to idle at a higher speed than that at the time of sealing.

It is preferable that the sealers are provided movably in the conveying direction of the packaging sheet, and the controller makes the sealer move from its initial position in the conveying direction of the packaging sheet after the longitudinal sealer is detached from the packaging sheet and before the sealer contacts the sheet again, and after the longitudinal sealer contacts the sheet, the controller makes the sealer return to the original position, rotating at a speed faster than at the time of sealing.

With the above configuration, even if the sealer is made to idle after the longitudinal sealer is moved away from the packaging sheet and again contacted with the packaging sheet, a gap is not formed in the region sealed by the longitudinal sealer. With this, it is possible to change the sealing interval in the transverse direction while reliably sealing the packaging sheet in the vertical direction.

It is preferable that the support member be provided with a moving mechanism to move at least one sealer to a sealing position where the longitudinal sealer is in close contact with the packaging sheet, and to a retracted position where it is moved away from the sheet.

Accordingly, in spite of a simple and inexpensive configuration of moving only the heat roller, it becomes possible to easily move the heat roller away from the packaging sheet, and easily change the rotating position of the transverse sealer with respect to the packaging sheet.

It is further possible to make the sealer rotate around one end, wherein the moving mechanism presses the other end of the one sealer to rotate it from the sealing position to the retracted position.

It is preferable that each of the sealers have a long cylindrical shape formed as one body from the same material.

With this configuration, it becomes possible to conduct heat uniformly, to make the portions heated by the sealers in an uniform temperature, and to appropriately seal the packaging sheet uniformly.

It is preferable that the above-mentioned pair of sealers is configured from a fixed heat roller, and a movable heat roller that is disposed parallel to the fixed heat roller and that rotates around one end to contact or move away from the fixed roller through the packaging sheet, and wherein the moving mechanism is provided with a motor for rotation, a connecting bar whose one end is rotatably connected in an eccentric position with respect to the rotating shaft of this motor for rotation, a moving piece connected rotatably at the other end of this connecting bar, and a pressing accepting member provided at the other end of the movable heat roller and that can be pressed by the moving piece.

With this configuration, by driving the motor for rotation, the movable heat roller can be rotated through the connecting bar, the moving piece and the pressing accepting member. Because of the simple configuration in which the connecting bar, moving piece and operation receiving member are simply connected to each other in a rotatable manner, manufacturing can be done at a lower cost and operation failures are not likely to occur.

It is preferable to provide a bias member to bias one sealer to other sealer, wherein the biasing force of the bias member can be adjusted.

Accordingly, despite of the simple and low-cost configuration, it becomes possible to not only bias one sealer to the other sealer, but also to adjust the biasing force.

It is preferable to provide a fixed block that rotatably holds one of the sealers, and a movable block that holds the other sealer rotatably and that is rotatably connected to the fixed block, wherein that the above-mentioned moving mechanism be attached to the end of the movable block.

With this configuration, it becomes possible to effectively utilizing dead space to dispose the moving mechanism, and to prevent an increase in the overall size of the apparatus. Further, even if the packaging sheet is jammed between the two sealers, the moving mechanism does not obstruct when rotating the movable block with respect to fixed block, and the packaging sheet can be easily removed.

It is preferable to provide a bias member that biases one sealer towards the other sealer, wherein the moving mechanism moves the other sealer between the sealing position and retracted position.

With this configuration, when one sealer is moved away from the other sealer, the biasing force of the bias member does not affect adversely, and the operation can be effected smoothly. Therefore, it becomes possible to manufacture the drive mechanism intended for detaching the sealers at a lower cost with a simple configuration.

It is preferable to provide a stopper for preventing rotation by contacting with one of the sealers when the other sealer is rotated to a retracted position by the moving mechanism.

With this configuration, even if one sealer is moved away from the other sealer, due to the action of the stopper, the one sealer will not advance into the conveyance path of the packaging sheet to cause an adverse effect.

According to the present invention, the position sealed by the transverse sealer can be adjusted in the length direction by moving the sealers and rotating them with at least the longitudinal sealer in a retracted position of being detached from the packaging sheet, and therefore, despite of a simple configuration, the sealing interval by the transverse sealer in a direction (transverse direction) orthogonal to the conveying direction can be changed. Also, because the longitudinal sealer and the transverse sealer are integrated, a temperature difference between the sealers is eliminated, and a packaging sheet can be sealed at a desired temperature. Therefore, since a packaging sheet made of a cheaper material where a difference between fusion temperature and heat resistance temperature is small can be used, it becomes possible to reduce the manufacturing cost of packaging sheet. In addition, the structure of sealers can be simplified by integrating the sealers, and the sealing interval of the packaging sheet by the transverse sealer can be changed in accordance with the supply amount of medicine.

BRIEF DESCRIPTION OF THE DRAWINGS

The present disclosure is described in conjunction with the appended figures.

DETAILED DESCRIPTION OF INVENTION

Embodiments of the present invention will be described hereinafter with reference to the accompanying drawings, in which preferred exemplary embodiments of the invention are shown. The ensuing description is not intended to limit the scope, applicability or configuration of the disclosure. Rather, the ensuing description of the preferred exemplary embodiments will provide those skilled in the art with an enabling description for implementing preferred exemplary embodiments of the disclosure. It should be noted that this invention may be embodied in different forms without departing from the spirit and scope of the invention as set forth in the appended claims.

First Embodiment

Figure 1:
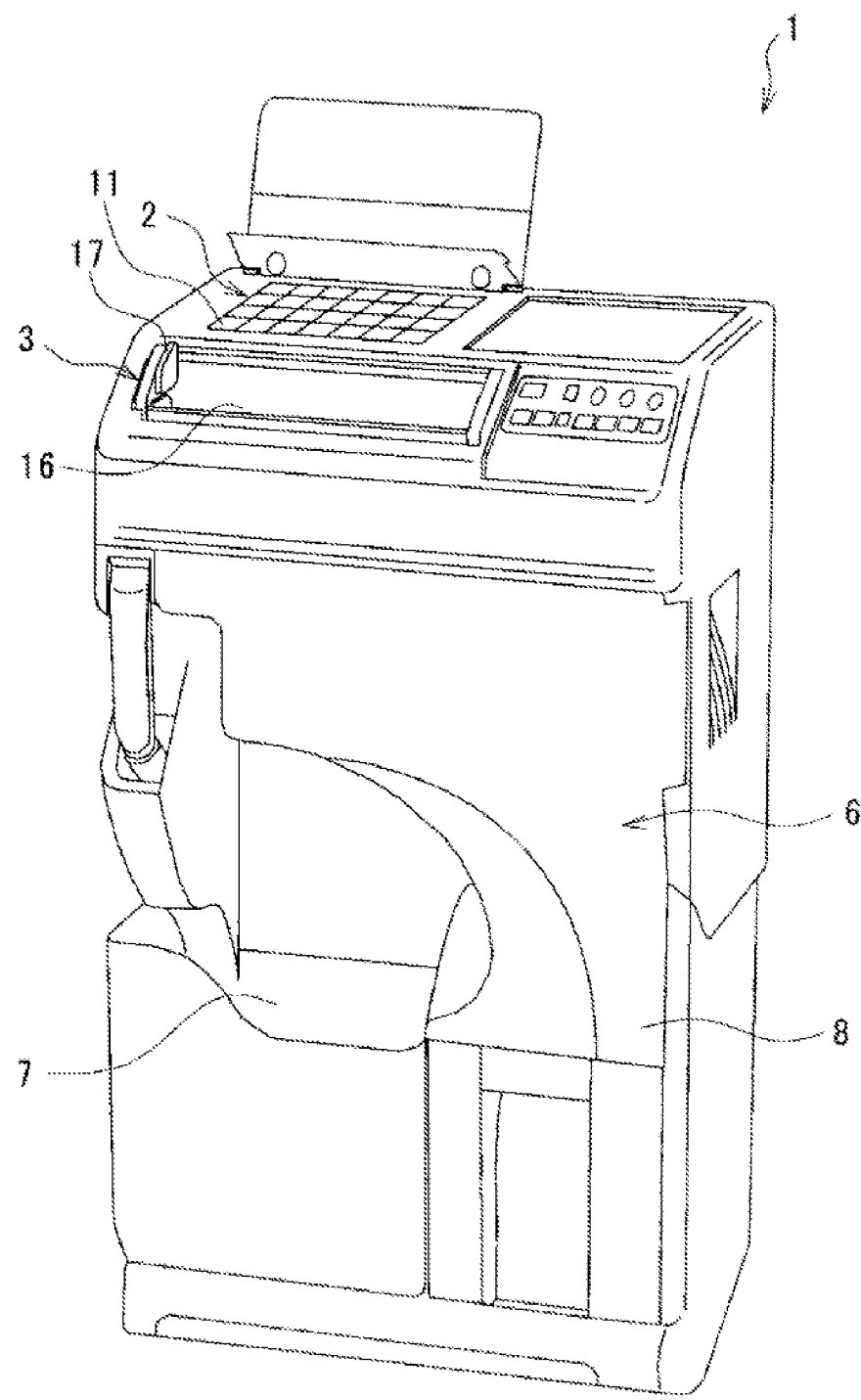
FIG. 1 is a perspective view of the exterior of a medicine packing apparatus according to the first embodiment seen from front.
Figure 2:
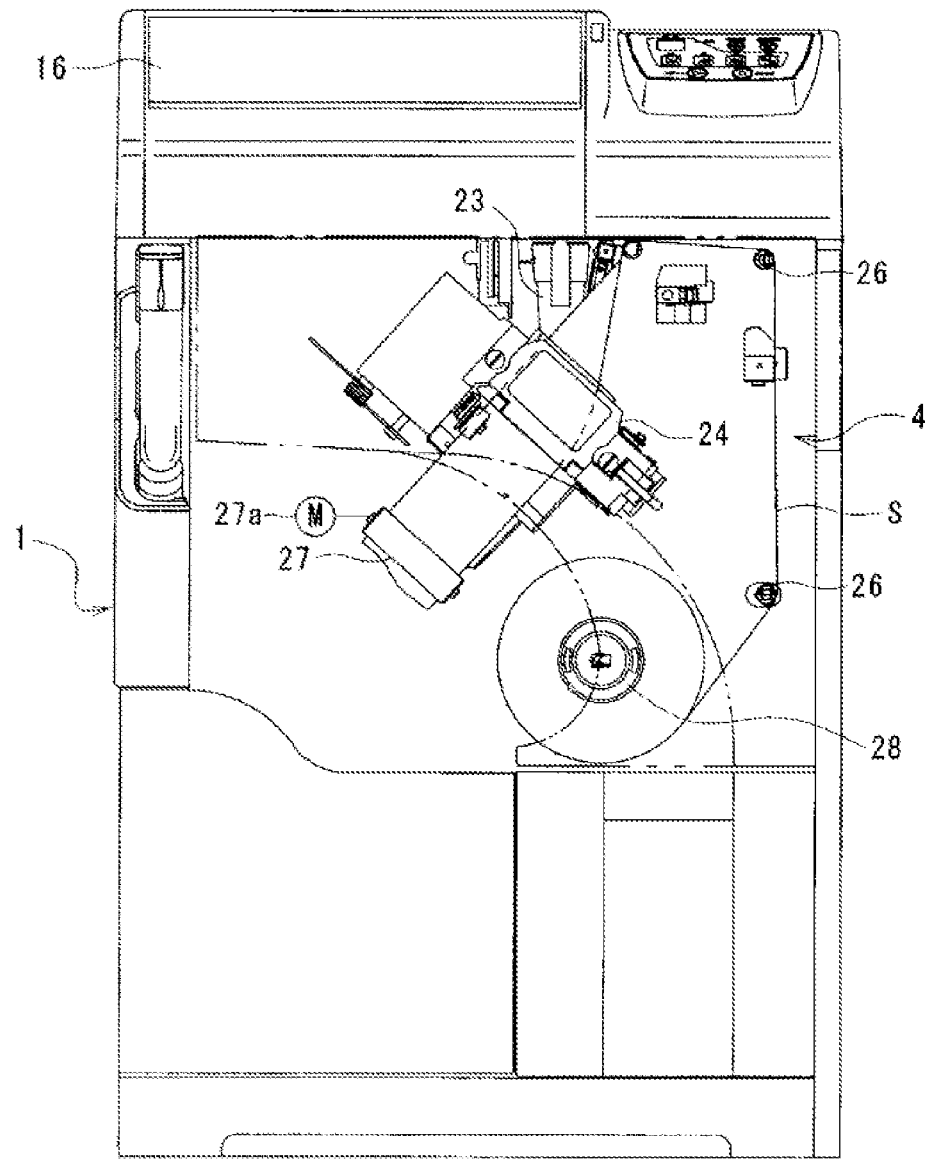
FIG. 2 is a front view of FIG. 1.

FIG. 1 and FIG. 2 show a medicine packing apparatus 1 according to the first embodiment. This medicine packing apparatus 1 comprises a tablet feeding unit 2, powder medicine feeding unit 3, and packaging unit 4. The tablet feeding unit 2 and powder medicine feeding unit 3, which constitute the medicine supplier, are installed on top of a housing 6. On the other hand, the packaging unit 4 is disposed inside the housing 6. The front opening of housing 6, excluding the medicine dispensing unit 7 through which packaged medicines are dispensed, is covered by an openable/closable one-way opening door-type cover 8 such that it can be opened/closed. When this cover 8 is opened, a worker will be able to access the packaging unit 4 that is housed inside the housing 6.

The tablet feeding unit 2 consists of a plurality of square-shaped tablet containers 11 arranged in a lattice shape, and one package quantity of tablets loaded manually into each square-shaped tablet container 11 is extracted automatically one by one, and delivered to the packaging unit 4.

Regarding the powder medicine feeding unit 3, powder medicine is manually loaded inside a long box (V box 16) with a roughly V-shaped cross-section open on the housing 6, and this powder medicine is divided into one package quantity each and supplied sequentially to packaging unit 4. A movable partition plate 17 is disposed inside V box 16 to adjust the divided quantity of the powder medicine.

The tablets or powder medicine supplied from the tablet feeding unit 2 or powder medicine feeding unit 3 through hopper 23 is packaged into each package by the packaging unit 4 with packaging sheet S. The packaging sheet S is wound on roll 28, transformed ultimately in a sloping downward direction through the mediation of a plurality of rollers 26, the lower end of the hopper 23 is positioned in the space that is formed by folding the sheet into V shape by a triangular plate. Regarding the packaging sheet S, to which the medicine was supplied through the hopper 23, its opening is sealed in transverse and vertical directions by the heat sealing part 24 in the further downstream, and packaged as one package. It is also possible to rewind the packaging sheet S that is wound on the roll 28 in a state of being folded into two along the longitudinal direction. The conveyance roller 27, which is a conveyance member provided rotatably in downstream of the conveying direction of the heat sealing part 24, is driven by a guide motor 27a, and holds and conveys the packaging sheet S that will be sealed by the heat sealing part 24.

Figure 3:
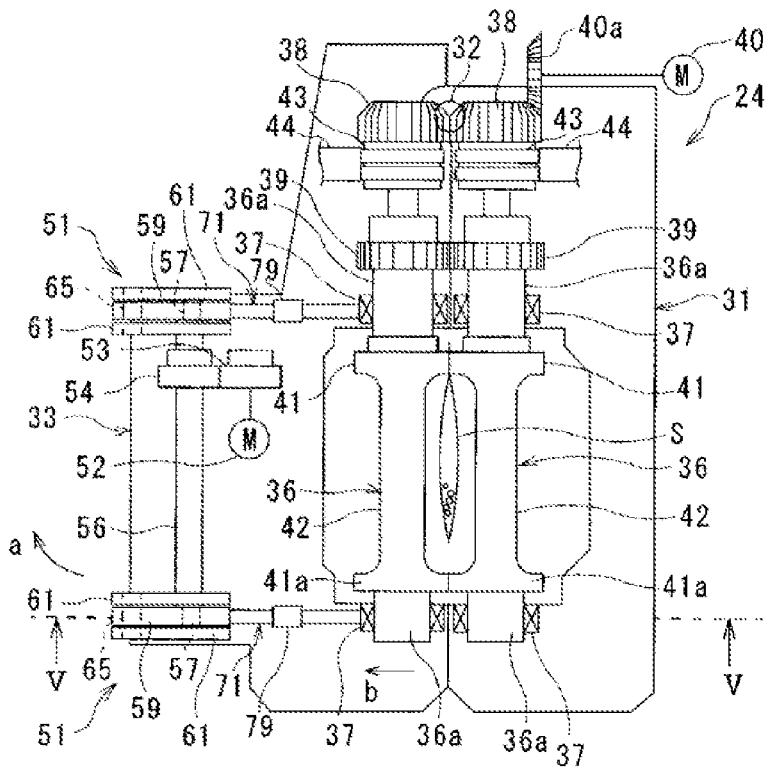
FIG. 3 is a front view of the heat sealing part shown in FIG. 2.

The heat sealing part 24 according to the present invention, as shown in FIG. 3, consists of a fixed block 31 fixed to the housing 6 shown in FIG. 1, and a movable block 33 that rotates around a spindle 32, which is provided at the top of this fixed block 31, in a direction (direction a in the drawing) where the lower part moves away from the fixed block 31, and that opens/closes with respect to the fixed block 31. The position where the movable block 33 is closed to the fixed block 31 is the heat sealing position, and the position that is open and moved away is the working position for inserting the packaging sheet S.

Both blocks 31 and 33 are provided with a heat roller 36 that is a sealer. Each of blocks 31 and 33 is provided with a corresponding bearing unit 37 to rotatably support the upper and lower part respectively of the shaft 36a of the heat roller 36. The heat roller 36 consists of an annular longitudinal sealer 41 that has an approximately I cross-section in the axial direction and that is located in the upper end of the roller, and a rolling part 41a that has a shape same as that of the longitudinal sealer 41 and that is disposed at the lower end of the roller, and a transverse sealer 42 disposed between the longitudinal sealer 41 and rolling part 41a. A heater (not shown in drawing) is accommodated inside the transverse sealer 42, and this heater heats the transverse sealer 42 and longitudinal sealer 41.

A main gear 38 and a sub-gear 39 are integrated to the shaft part 36a which extends in the upper direction from the top end of the heat roller 36. As the teeth of the main gear 38 is deep in the radial direction, it can mesh with the movable block 33 whether it is in heat sealing position or working position. When the movable block 33 is in heat sealing position, the main gears 38 and sub-gears 39 will respectively mesh with each other, and when the movable block 33 is in working position, the sub-gears 39 move away and the main gears 38 will mesh with each other. That is, by the open/close operation of the blocks 31 and 33, the main gears 38 will definitely mesh with each other. Therefore, a driving force is transmitted from heat roller drive motor 40 to the main gear 38 of fixed block 31 via the drive gear 40a. As a result, when the heat roller 36 is rotated via main gear 38 of fixed block 31 by driving the heat roller drive motor 40, the heat roller 36 of movable block 33 also rotates in synchronization. Therefore, it will be possible to maintain a constant positional relationship between the two blocks 31 and 33. Further, since one pair of heat rollers 36 is driven by one heat roller drive motor 40, the structure of the heat sealing part 24 can be simplified.

Because a trolley electrode 43 is provided between the main gear 38 and sub-gear 39, and a power supply brush 44 is in sliding contact with this trolley electrode 43, power is supplied to the heater.

By connecting a support member 51 to each of the upper and lower bearings 37 of the heat roller 36 disposed in the movable block 33, the heat roller 36 is disposed such that it can be moved in the b direction. The support member 51 includes a connecting part drive motor 52 which is a power source, a swing member 59 (see FIG. 4) that can be rotatably driven around the spindle 65 by this connecting part drive motor 52, and a connecting part 71 connecting this swing member 59 and bearing 37 of the heat roller 36.

A drive gear 53 is coupled to the connecting part drive motor 52, and a driven gear 54 that meshes with the drive gear 53 is disposed on the rotating shaft 56. Circular cam 57 is provided eccentrically at both ends of the rotating shaft 56.

The swing member 59 has a substantially L-shape in a plane view and is provided so as to be rotatable around a spindle 65 formed from a rod, and a long hole 60 is formed in one arm 62, and the other arm 63 is connected to a connecting part 71 via a pin 66.

By passing the spindle 65 through the holding member 61 disposed on both sides of the swing member 59, the swing member 59 is held rotatably in the holding member 61. Bearing 58 is fitted in the long hole 60, and the swing member 59 is coupled to the cam 57 via this bearing 58. By providing a long hole 60, even when the eccentric cam 57 rotates, the interference between this cam 57 and swing member 59 can be avoided, and the swing member 59 will be able to rotate. When the cam 57 rotates, arm 62 moves in the upper/lower direction, and the swing member 59 rotates around the spindle 65, and as a result, the arm 63 moves in direction b in the drawing or in its opposite direction.

The connecting part 71 is comprised of a swing member side rod 72 connecting to pin 66, a heat roller side rod 76 that secures a bracket 74 fixed to the outer circumference of the bearing 37 of shaft 36a of the heat roller 36, and a cylindrical rod-connecting part 79 that connects the swing member side rod 72 and the heat roller side rod 76. A threaded section 75 is formed in the outer circumference of the swing member side rod 72, and a first nut 73 is screwed to this threaded section 75. Similarly, a threaded section 75 is formed in the outer circumference of the heat roller side rod 76, and a second nut 77 is screwed to this threaded section 75. A tooth part 79a is formed on the swing member 59 side of the rod connecting part 79 and in an inner circumference thereof, and this tooth part 79a is engaged with the threaded section 75 of the swing member side rod 72. By tightening the first nut 73 and rod connecting part 79 to the threaded section 75 so that the first nut 73 and the rod connecting part 79 contact, both of the members 73 and 79 are fixed to the swing member side rod 72. A flange 79b is formed in the inner peripheral surface of the opened end side of the heat roller 36 of the rod connecting part 79 A configuration is provided in which the second nut 77 is positioned away from the flange 79b, so that when the rod connecting part 79 moves in direction b, the second nut 77 engages with the flange 79b, and moves the heat roller side rod 76 in direction b. A spring member 78 is externally inserted in the heat roller side rod 76, and one end of this spring member 78 is engaged with a bracket 74 and the other end is engaged with a rod connecting part 79. With this configuration, at all times, the heat roller 36 is always biased by the spring member 78 in the direction of the other heat roller 36. Further, as the spring members 78 are engaged with the rod connecting part 79, by varying the fixing position of the rod connecting member 79, the biasing force of the heat roller 36 by the spring members 78 can be adjusted.

When the swing member 59 rotates in direction b, through the swing member side rod 72, the rod connecting member 79, second nut 77 and heat roller side rod 76, the heat roller 36 is moved in direction b by resisting the biasing force of the spring member 78. Also, by changing the fixing position of first nut 73 and rod connecting member 79 in swing member side rod 72, the length of the connecting part 71 can be adjusted.

Figure 6:
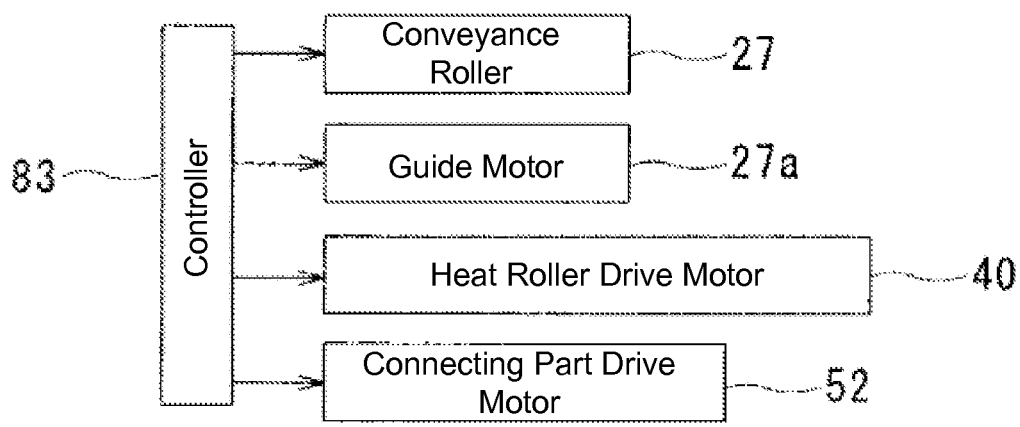
FIG. 6 is a block diagram showing a state wherein the controller and various motors are connected.

As shown in FIG. 6, a conveyance roller 27, guide motor 27a, heat roller drive motor 40 and connecting part drive motor 52 are respectively connected to the controller 83, and they are controlled based on the signals from this controller 83.

Next, operation of the heat roller 36 having the above-mentioned configuration is described.

Figure 7:
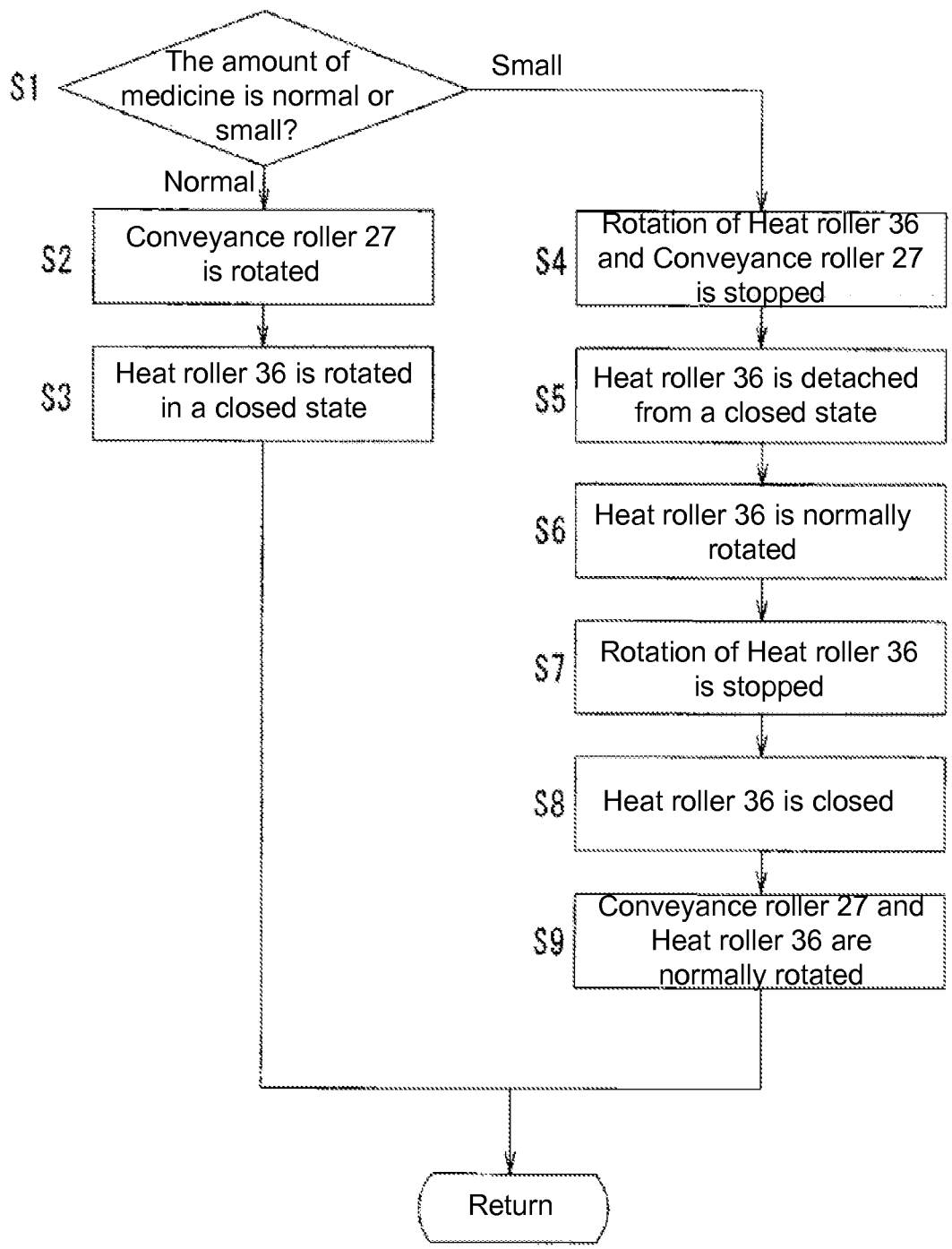
FIG. 7 is a flow chart for controlling the heat sealing portion of FIG. 3.
Figure 8:
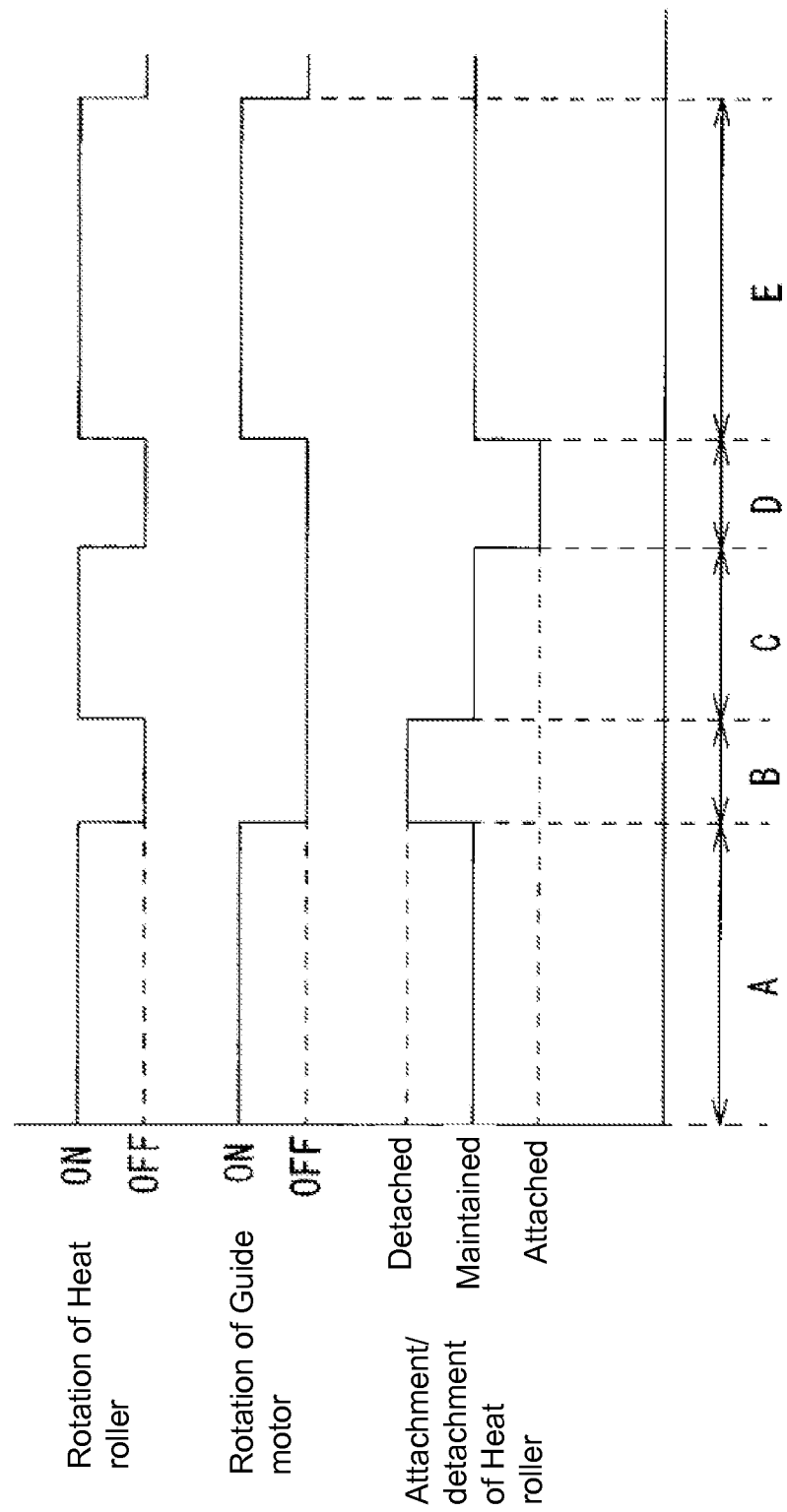
FIG. 8 is a graph showing the timings of the rotation of heat roller and conveyance roller reducing the sealing interval of the transverse direction and opening/closing operation of the heat roller.

Referring to the flowchart shown in FIG. 7, the controller 83 detects whether the amount of medicine to be packaged is normal or small based on the prescription data in step S1. If the amount of the medicine is normal, it will proceed to step S2, and the controller 83 rotates the conveyance rollers 27 as shown in region A in FIG. 8. Then, it will proceed to step S3, by rotating with the heat rollers 36 in a closed state, that is, in a state wherein the longitudinal sealers 41 are attached through the packaging sheet S, the packaging sheet S can be sealed by maintaining the sealing intervals in transverse direction at a constant interval L3 (see FIG. 9). Here, the longitudinal sealer 41 seals the packaging sheet S in the vertical direction by rolling on the opening of the packaging sheet S. Further, both of the edge sections of the transverse sealer 42 come in contact with the packaging sheet S with every half rotation and seal the sheet in the transverse direction. By integrating the longitudinal sealer 41 and the transverse sealer 42, a temperature difference within the heat rollers 36 is eliminated and it becomes possible to seal the packaging sheet S at a desired temperature. Therefore, since packaging sheet S made of cheaper material having a small difference between the fusion temperature and heat resistance temperature can be used, it becomes possible to reduce the manufacturing cost of packaging sheet S. A material having a small difference between the fusion temperature and heat resistance temperature includes PET (polyethylene terephthalate) and PS (polystyrene). Conventionally, cello poly having a large difference between the fusion temperature and heat resistance temperature was used as a material of packaging sheet S, but the cost of PET is cheaper by 20-30% and that of PS is cheaper by 30-40% than cello poly, and it becomes possible to lower the cost of the packaging sheet S according to present invention. Regarding the heat rollers 36, as shown in FIG. 10, the heat roller 36 at top in the drawing is rotated clockwise to rotate the heat roller 36 below anticlockwise (hereafter referred as normal rotation).

Figure 4:
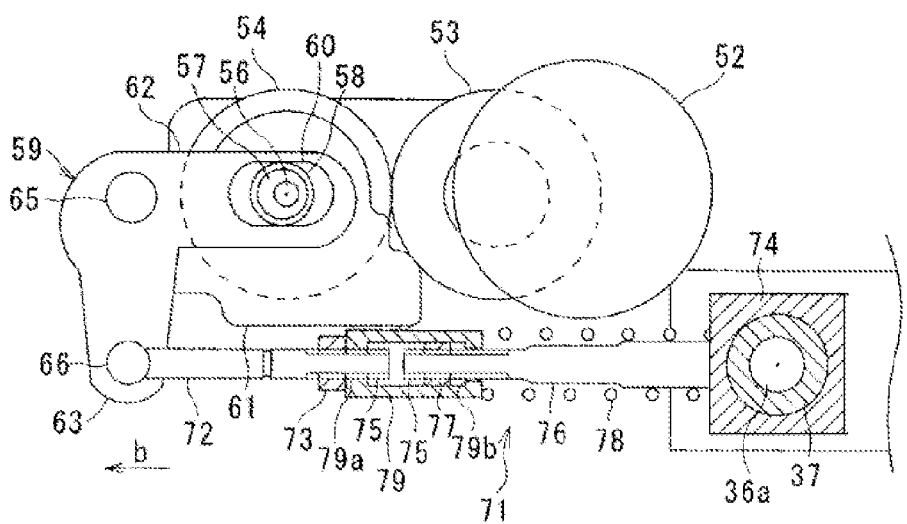
FIG. 4 is a cross-sectional view of the V-V line in FIG. 3.
Figure 5:
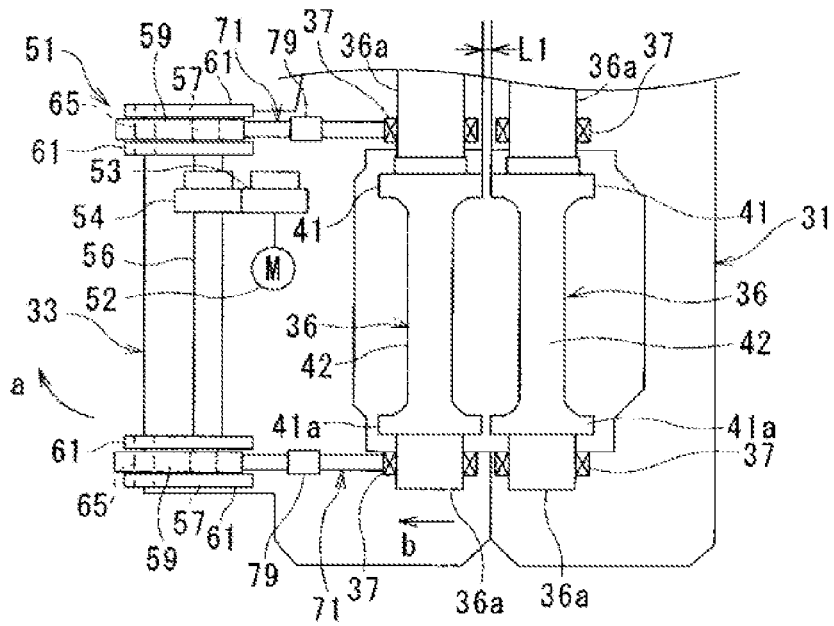
FIG. 5 is a front view of FIG. 3 showing a state wherein the heat roller of movable block is away from the heat roller of the fixed block.
Figure 11:
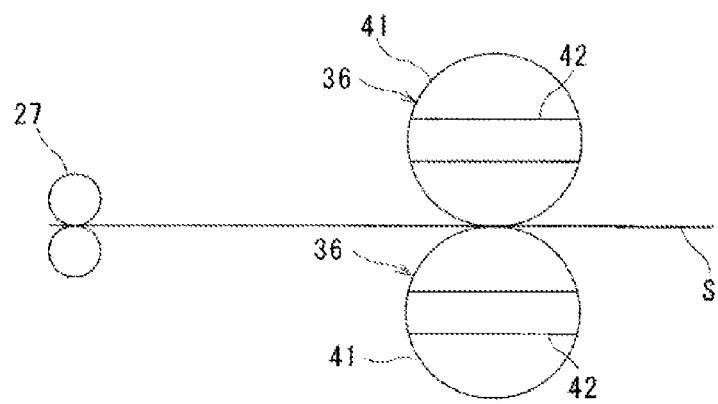
FIG. 11 is a side view showing the operation of heat roller and conveyance roller shifting from section A to section B of FIG. 8.
Figure 12:
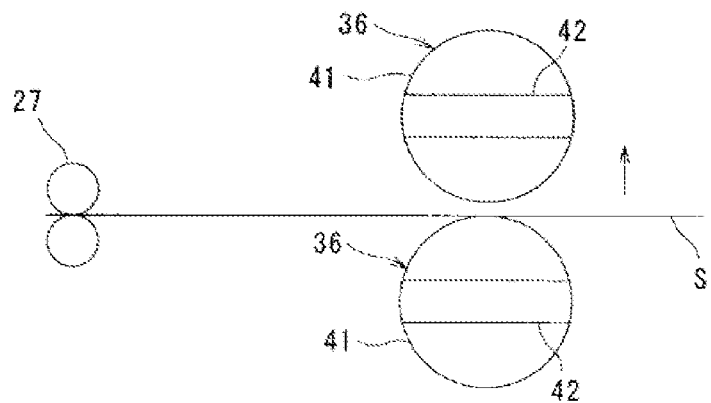
FIG. 12 is a side view showing the operation of heat roller and conveyance roller in the section B of FIG. 8.
Figure 13:
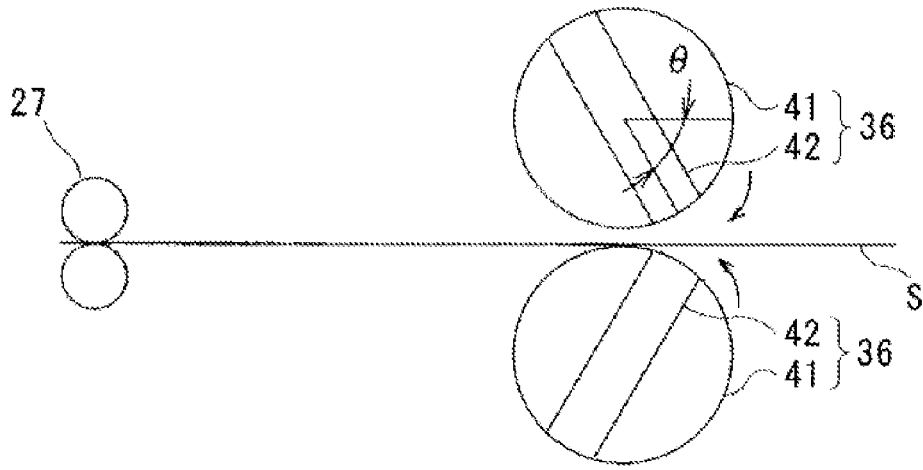
FIG. 13 is a side view showing the operation of heat roller and conveyance roller in the section C of FIG. 8.
Figure 14:
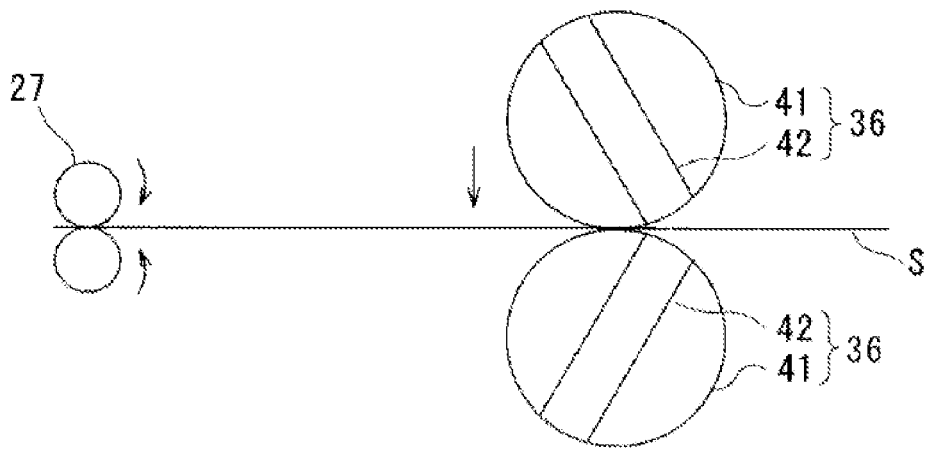
FIG. 14 is a side view showing the operation of heat roller and conveyance roller in the section D of FIG. 8.
Figure 15:
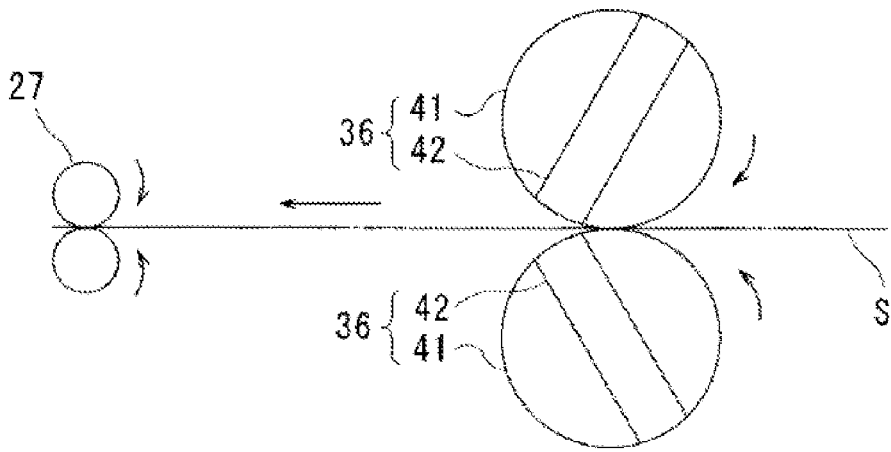
FIG. 15 is a side view showing the operation of heat roller and conveyance roller in the section E of FIG. 8.

If the amount of the medicine to be packaged is small, the said interval L3 needs to be narrowed. Therefore, it will proceed to step S4, and as shown in FIG. 11, rotation of heat rollers 36 and conveyance rollers 27 are stopped in section B of FIG. 8. Next, proceeding to step S5, the controller 83 detaches the heat rollers 36 from a closed state (see FIG. 12). More specifically as shown in FIG. 4, by driving the connecting part drive motor 52, the swing member 59 is moved in direction b by cam 57 via drive gear 53 and driven gear 54. By doing so, through the mediation of swing member side rod 72, rod connecting member 79 and heat roller side rod 76, the shaft 36a of heat roller 36 of movable block 33 is moved in the b direction. This produces a space L1 between the heat roller 36 of the fixed block 31 and the heat roller 36 of the movable block 33 (see FIG. 5). This space L1 here is 0.5 mm, however, it is not particularly limited. Then, in step S6, with the packaging sheet S in a stopped state, as shown in section C of FIG. 8, the heat rollers 36 are normally rotated in a detached state in FIG. 13. As a result, the heat rollers 36 rotate idly. In section D of FIG. 8, while maintaining a state in which rotation of the conveyance rollers 27 is stopped as shown in FIG. 14, proceeded to step S7, rotation of heat rollers 36 is stopped, and in step S8, the heat rollers 36 are moved to a closed state from an open state. More specifically, by continuing to drive the above-mentioned connecting part drive motor 52, the swing member 59 is moved in a direction opposite to the direction b driven by the cam 57. As a result, the shaft 36a of the heat roller 36 is also moved in the same direction, and the heat rollers 36 are closed. On proceeding to step S9, in the region E of FIG. 8 as shown in FIG. 15, with the heat rollers 36 in contact with each other through the packaging sheet S, the conveyance rollers 27 and heat rollers 36 are normally rotated. As a result, the side is sealed by the longitudinal sealer 41 while the sheet S is being conveyed, and sealing is continued in the transverse direction by the transverse sealer 42 at intervals of a spacing L4. Thereupon, this flow is finished, and returns to step S1 again. With the above operations, the sealing interval in a transverse direction by transverse sealer 42 can be narrowed by the amount of idling (normal rotation) of the heat rollers 36 in section C.

Figure 9:
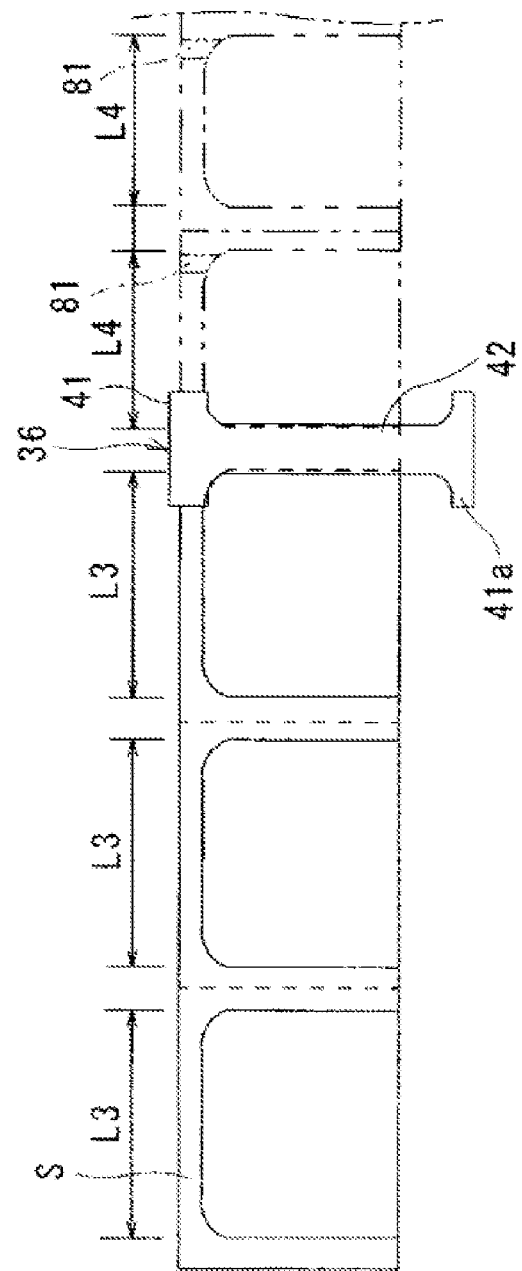
FIG. 9 is a top view depicting a state of heat roller sealing a packaging sheet.
Figure 10:
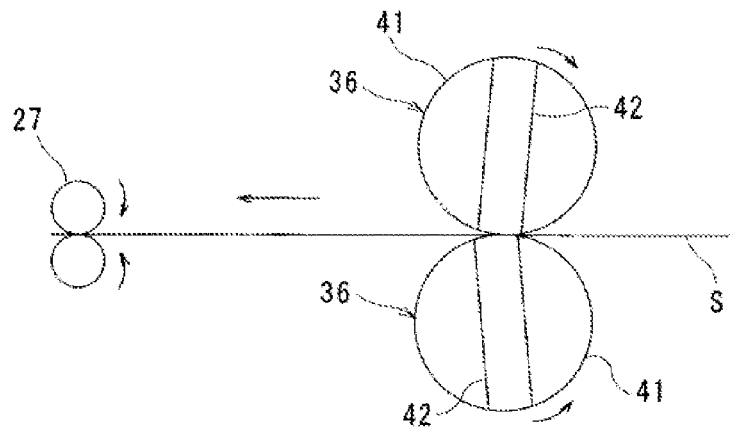
FIG. 10 is a side view showing the operation of heat roller and conveyance roller in the section A of FIG. 8.

Moreover, when moving the heat rollers 36 from a detached state to an attached state, the portion sealed by longitudinal sealer 41 overlaps as shown in FIG. 9 resulting in an undesirable appearance, and therefore, it is preferable that heat rollers 36 are attached and detached at a timing such that this overlapped seal portion 81 occurs at an end portion of each package.

An angle of 60°, for example, is used as an angle of idling (normal rotation) θ for the heat rollers 36, however, the same effect can be obtained by idling (normally rotating) at 240° and 420°. Further, by decreasing the angle θ to less than 60°, it is possible to increase the sealing interval in the transverse direction as compared to the case of 60°, and by increasing the angle θ greater than 60° and less than 90°, the above-mentioned sealing interval of the transverse direction can be further decreased. With these, the angle θ can be adjusted according to the desired sealing interval.

Various angles may be used for the angle θ. For example, by idling (normally rotating) at more than 90°, that is, at 110°, 170°, 290° or 350°, the sealing interval in the transverse direction can be increased as compared to the normal angle, and by idling (normally rotating) at 190°, 220°, 370° or 400°, the sealing interval in the transverse direction can be reduced as compared to the normal angle.

In the present embodiment, the heat rollers 36 are detached from a state where the transverse sealers 42 are located in the horizontal direction in section B, but it is possible to obtain the similar effect by having a configuration of hastening or delaying the timing of detachment.

Here, in the present embodiment, though the heat rollers 36 were rotated in normal direction in section C for the case of the amount of medicine being less than usual, in case of the amount of medicine being more than usual, it is possible to use a configuration wherein the heat roller 36 at top in the drawing is rotated in the anticlockwise direction and the heat roller 36 at the bottom is rotated in a clockwise direction (hereafter referred to as inversion). With this, it is possible to widen a sealing interval in the transverse direction of the packaging sheet S. Moreover, although 10° may be employed, for example, as an angle θ of idling (inverting) the heat roller 36, it is possible to obtain the similar effect by idling (inverting) at 190° and 370°, and there is no particular limitation as long as the sealing interval in the transverse direction can be increased. On the other hand, if 110°, 170°, 290° or 350°, for example, is used as the idling (inversion) angle, the sealing interval in the transverse direction can be reduced as compared to the normal angle.

As it is possible to broaden the sealing intervals in the transverse direction without increasing the diameter of the heat rollers 36, the manufacturing cost of heat rollers 36 can be reduced and heat can be transferred efficiently to sealers 41 and 42 as compared to the case of increasing the diameter. Therefore, the preheating time for heating the sealers 41 and 42 can be reduced so that sealing can be carried out immediately after switching on the medicine packing apparatus 1, and the amount of heat required to heat the sealers 41 and 42 can also be reduced.

The present invention is not limited to the above embodiment, and various modifications are possible.

Figure 16:
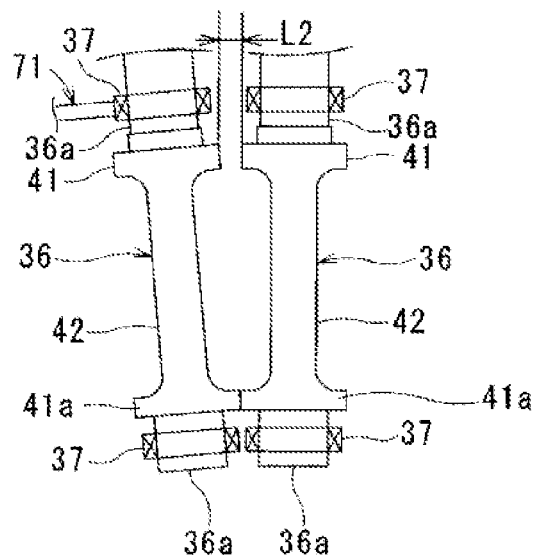
FIG. 16 is a front view showing a state in the other embodiment of FIG. 5 wherein the heat roller of the movable block has moved away from the heat roller of the fixed block.

In the embodiment described above, one heat roller 36 was slid parallel to the other heat roller 36, but it is not limited to this, and as shown in FIG. 16, it is possible to connect only the bearing 37, which is located on the longitudinal sealer 41 of the heat roller 36 disposed on the movable block 33, to the connecting part 71. Here, the other bearing 37 is tiltably fixed to the movable block 33 by a known method. Thereupon, the similar effect can be obtained by adopting a configuration wherein a predetermined interval L2 is created between the heat rollers 36 by having the connecting part 71 pull the bearing 37 and rotating the heat roller 36 around the shaft.

Also, in the embodiment described above, a packaging sheet S was sealed at the both edges of the transverse sealer 42, that is, in two places, but it is also possible to use a configuration to seal at only one edge. With this, it is possible to increase the adjustment margin of sealing in the transverse direction.

Figure 17:
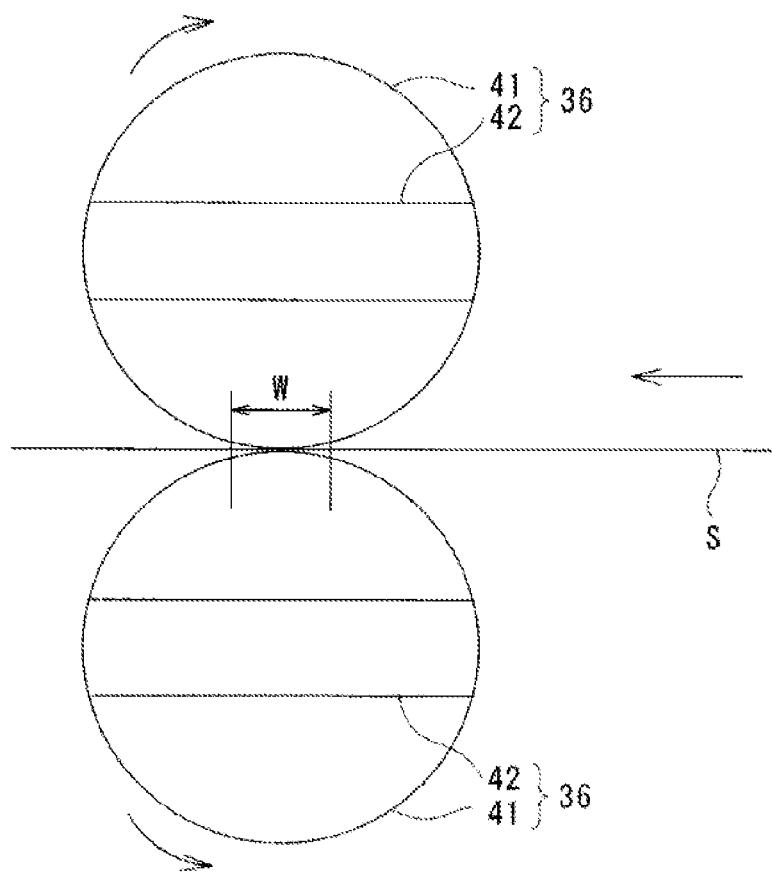
FIG. 17 is a partial magnified side view of a heat roller showing the vertically sealable area by longitudinal sealer.

In the embodiment described above, conveyance of the packaging sheet S was stopped when the heat rollers 36 are detached, however, it is possible to adopt a configuration wherein the heat rollers 36 are detached while conveying the packaging sheet S. Referring to FIG. 17, following description is provided based on an assumption that the longitudinal sealer 41 can seal the packaging sheet S by welding within the range shown in vertically sealable region W.

Figure 18:
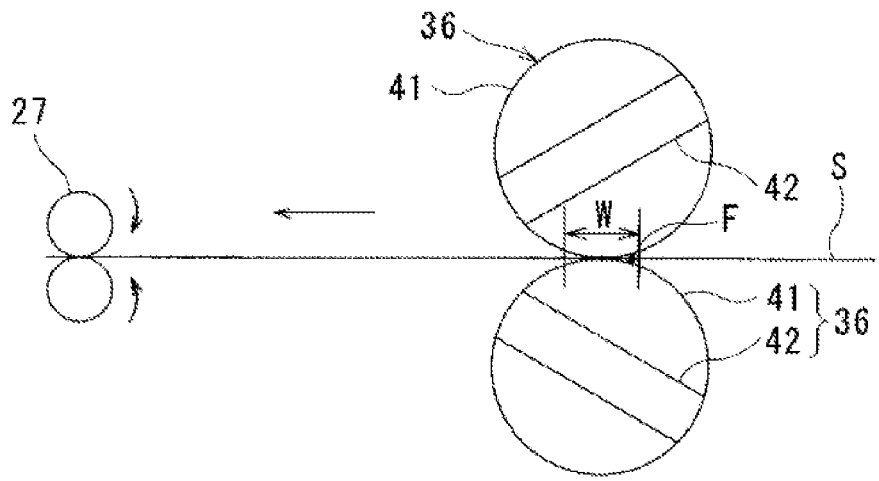
FIG. 18 is a side view showing the operation of heat roller and conveyance roller before moving away the heat roller in one embodiment of varying the sealing intervals in a transverse direction while the conveying sheet is being conveyed.
Figure 19:
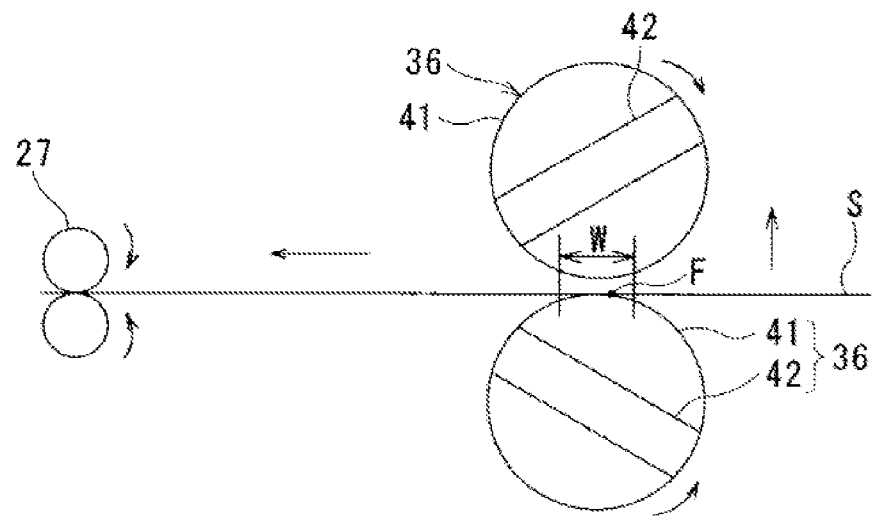
FIG. 19 is a side view showing the state wherein the heat roller of FIG. 18 is moved away.
Figure 20:
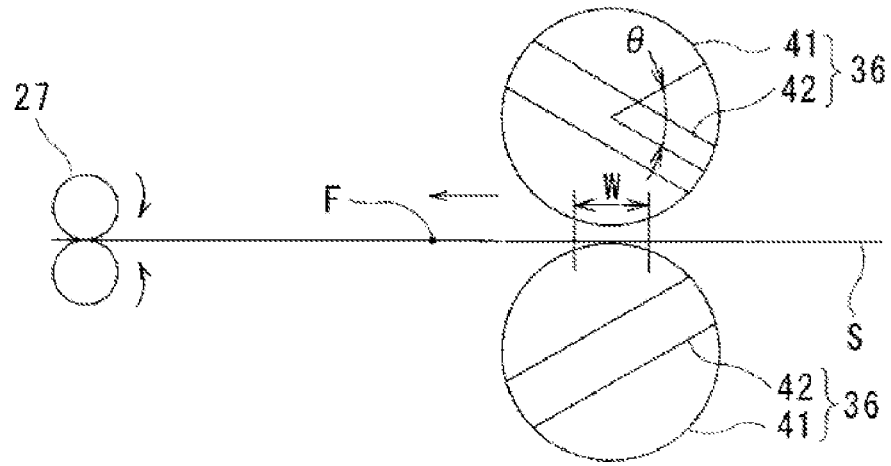
FIG. 20 is a side view showing a state when the conveyance roller is rotated at a normal speed while the heat roller shown in FIG. 19 is moved away.
Figure 21:
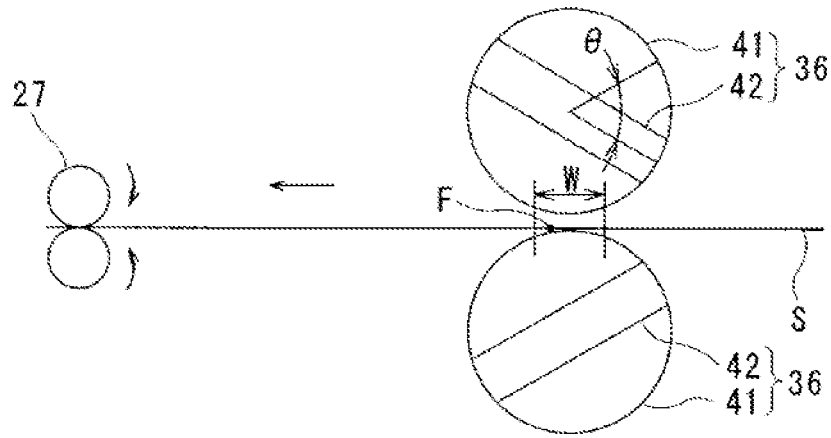
FIG. 21 is a side view showing a state when the conveyance rollers are rotated at a low speed while a heat roller shown in FIG. 19 is moved away.
Figure 22:
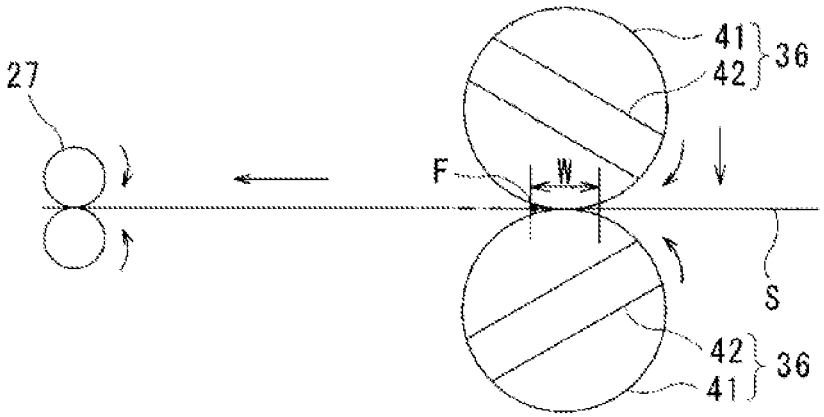
FIG. 22 is a side view showing a state wherein the heat rollers of FIG. 21 are contacted through the packaging sheet.

As shown in FIG. 18, the conveyance rollers 27 and heat rollers 36 are normally rotated and sealing is being done in the longitudinal direction by the longitudinal sealer 41 while conveying a packaging sheet S. Here, an optional point F on the packaging sheet S is located in the vertically sealable region W. In order to narrow the sealing interval L3 by transverse sealer 42, the heat rollers 36 are detached while normally rotating the conveyance roller 27 as shown in FIG. 19, and a conveying speed of the packaging sheet S by the conveyance rollers 27 is set to a low speed. Then, the heat rollers 36 are idled (normal rotation) only by an angle θ. If the packaging sheet S is conveyed at an usual speed while the heat rollers 36 are detached, the point F deviates from the vertically sealable region W (see FIG. 20), and if the heat rollers 36 are again contacted through the packaging sheet S, a gap is formed in the vertical sealing region of the packaging sheet S. However, by reducing the conveying speed of the packaging sheet S as described above, when the heat rollers 36 are again contacted through the packaging sheet S as shown in FIG. 22, it becomes possible to maintain the point F within the vertically sealable region W. In this way, the packaging sheet S can be vertically sealed continuously, and apart from preventing the formation of gaps, the sealing interval in the transverse direction can be narrowed. However, the sealing interval in the transverse direction can be small or large by changing the angle θ as described above.

In the present embodiment, the conveying speed of the packaging sheet S was set to low speed, however, as long as point F is maintained inside the vertically sealable region W while the heat rollers 36 are detached, there is no restriction to this. For example, the similar effect can be obtained when the heat rollers 36 are idled at high speed and the speed of detachment and attachment is increased while maintaining the normal conveying speed instead of low speed.

Figure 23:
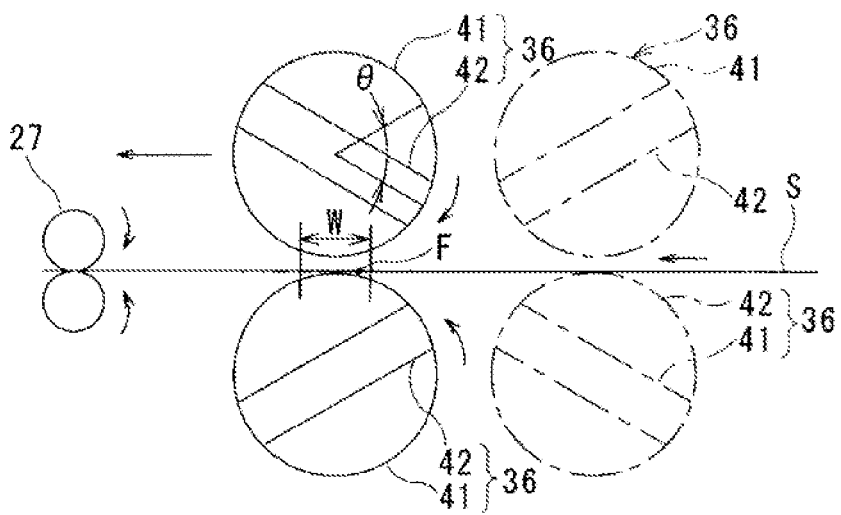
FIG. 23 is a side view showing the operation of detaching and moving the heat rollers in the embodiment of varying the sealing intervals in a transverse direction while the conveying sheet is being conveyed.
Figure 24:
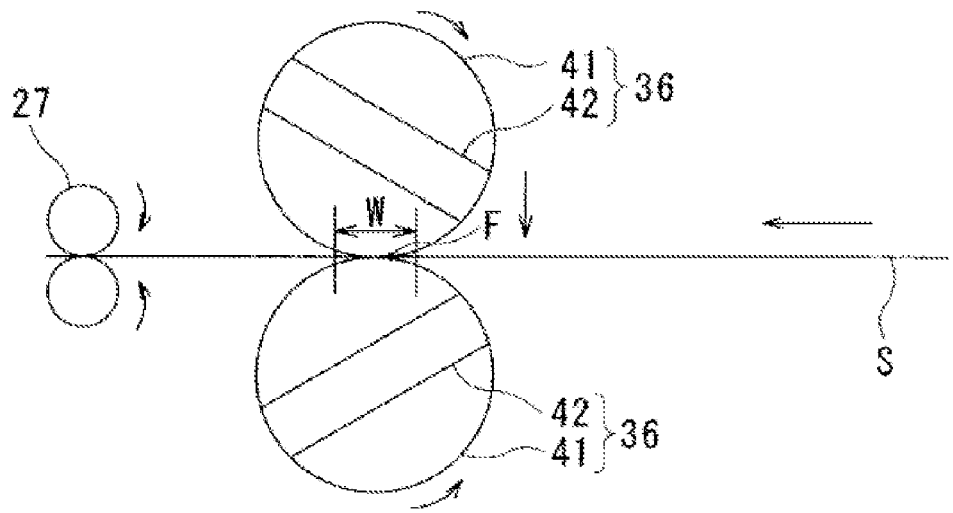
FIG. 24 is a side view showing a status wherein the heat rollers of FIG. 23 are contacted through the packaging sheet.
Figure 25:
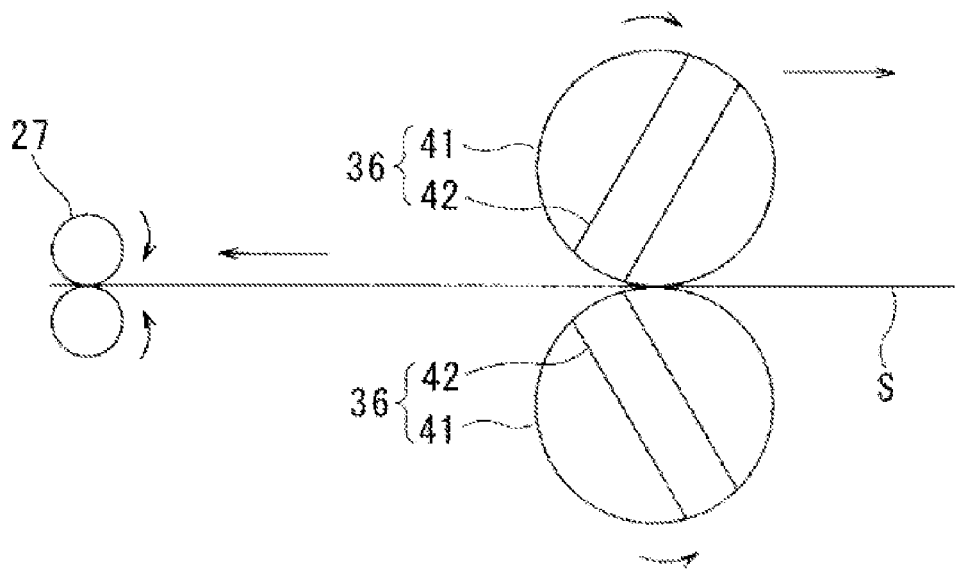
FIG. 25 is a side view showing a state wherein the heat rollers of FIG. 23 have returned to the initial position by rotating while performing vertical sealing.

In addition, another embodiment of detaching the heat rollers 36 while conveying the packaging sheet S will be described. In the above embodiment, in FIG. 19, in addition to detaching the heat rollers 36 while normally rotating the conveyance rollers 27, the conveying speed of the packaging sheet S by the conveyance rollers 27 was reduced. However, it is possible to have a configuration wherein, while maintaining a constant conveying speed of conveying sheet S, the heat rollers 36 can be detached and moved in the conveying direction of the conveying sheet S as shown in FIG. 23. Here, in addition to moving the heat rollers 36, they are also idled only by an angle θ in the normal rotation direction. With this, as shown in FIG. 24, when the heat rollers 36 are again contacted through the sheet S, the point F can be maintained inside the vertically sealable region W and the sealing intervals in the transverse direction can be made smaller. Thereupon, as shown in FIG. 25, the heat rollers 36 are rotated quickly and returned to an initial position while the heat rollers 36 are in contact with the packaging sheet S and vertically sealing the sheet.

Second Embodiment

The configuration of heat sealing part 101 according to another embodiment is shown in FIG. 26 through FIG. 33. The heat sealing part 101 is different from that of the abovementioned embodiment mainly in a mechanism to facilitate idling by rotating the movable heat roller 127 to detach it from the packaging sheet S.

Figure 29:
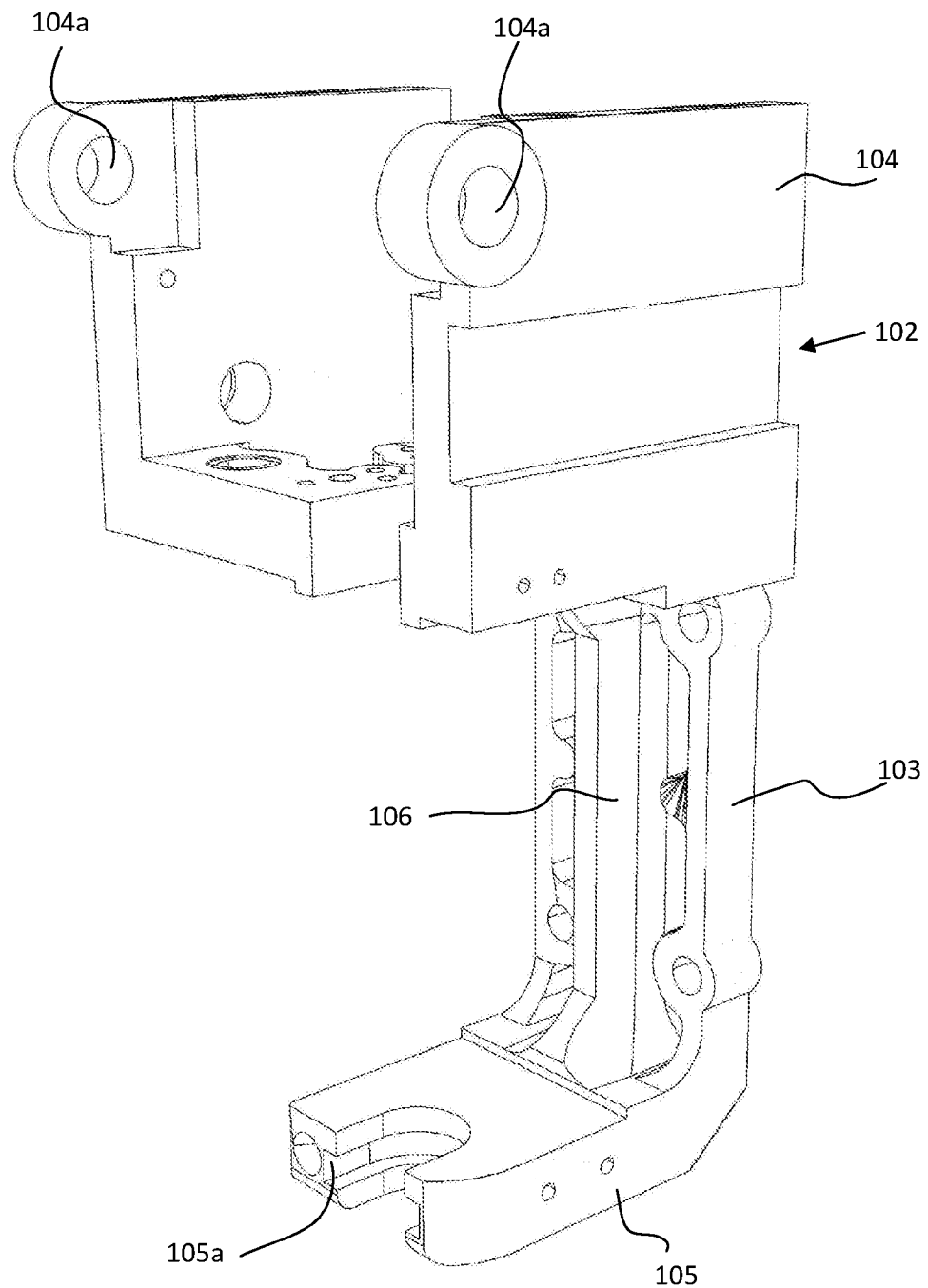
FIG. 29 is a perspective view of the fixed block of FIG. 26.

As shown in FIG. 29, the fixed block 102 is comprised of a plate-shaped attaching part 103, a first holding part 104 continuous with one end of the attaching part 103, and a second holding part 105 that protrudes orthogonally from the other end of the attaching part 103.

By providing a protrusion 106 in the middle of one side of the attaching part 103, the strength of the attaching part 103 can be increased, and its both sides can be fixed, as appropriate, to the inner surface of housing 6 or the like by screws.

Figure 26:
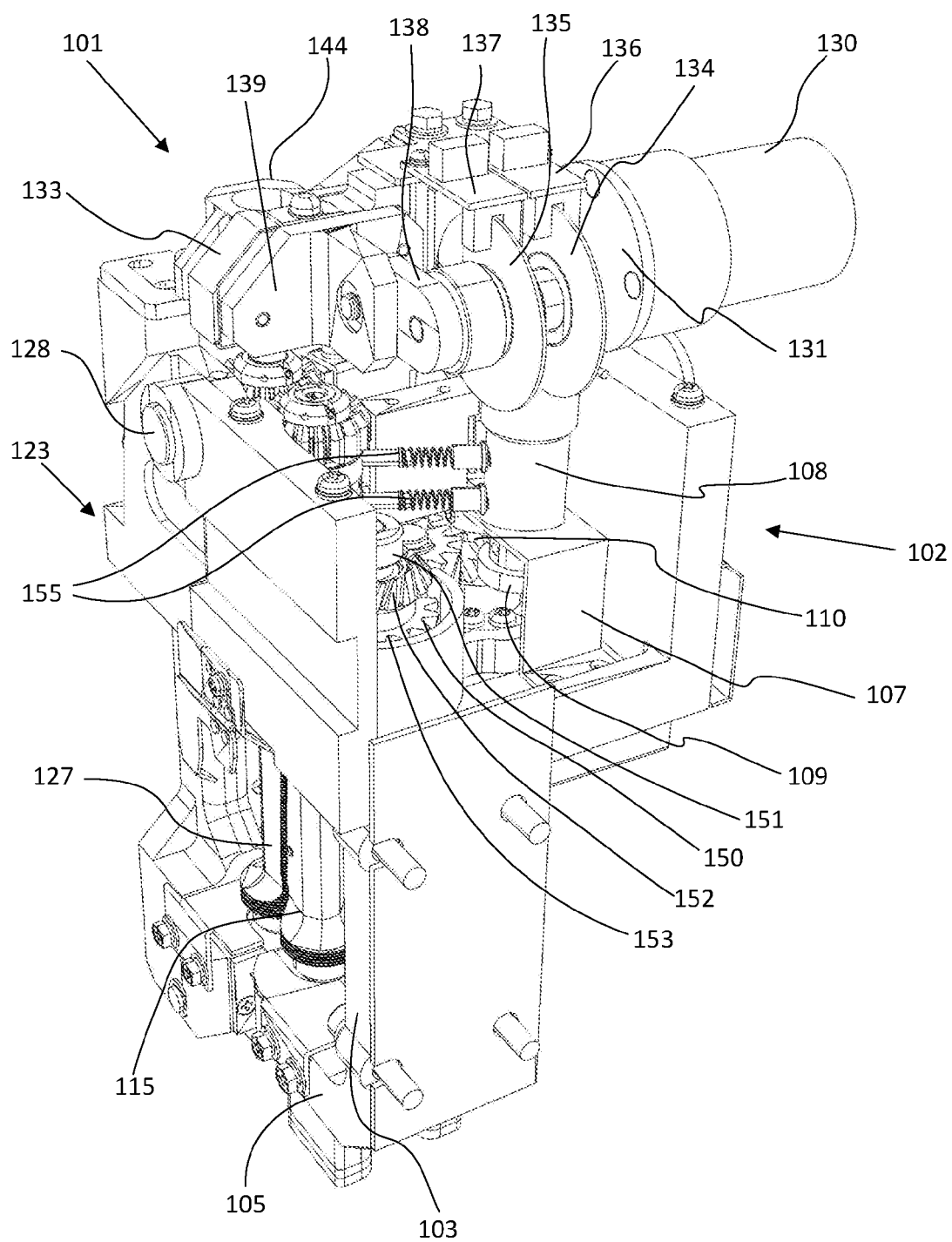
FIG. 26 is a perspective view of heat sealing unit according to the second embodiment.

The first holding part 104 is of roughly U shape, and in the corners of two facing walls, through-holes 104a are respectively provided for rotatably supporting the shaft member 128 for connecting the movable block 123 rotatably. Also, at the bottom of the first holding part 104, as shown in FIG. 26, an inverted L-shaped mounting plate 107 projecting in the same direction as the both side walls is provided, and motor for conveyance 108 is installed therein. A drive gear 109 is fixed to the rotating shaft of the motor for conveyance 108, and through a driven gear 110 that meshes with this drive gear 109, a pair of conveyance rollers 111 and 113 can be driven to rotate.

Figure 30:
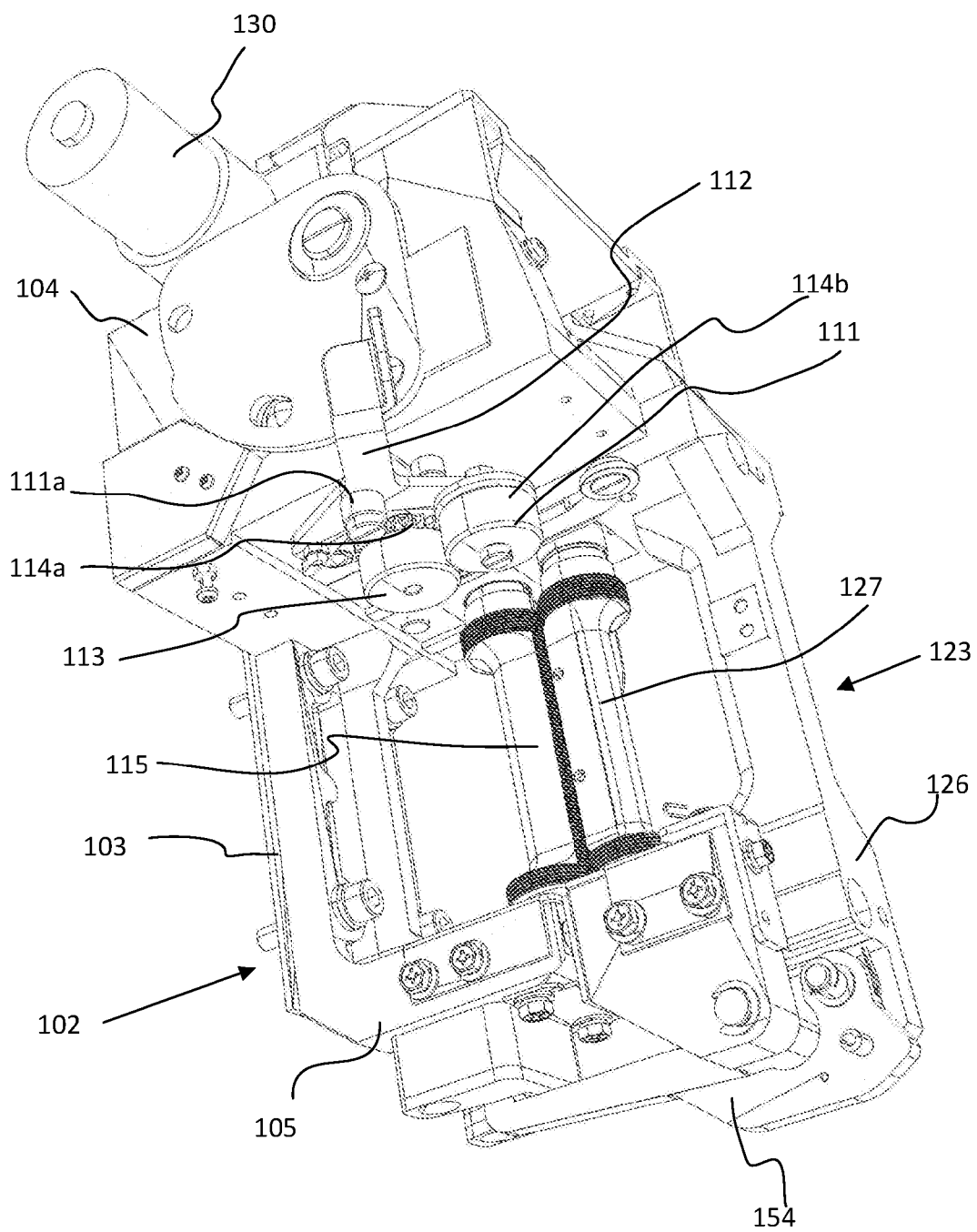
FIG. 30 is a perspective view of the heat sealing part of FIG. 26 as seen from a different angle.
Figure 31:
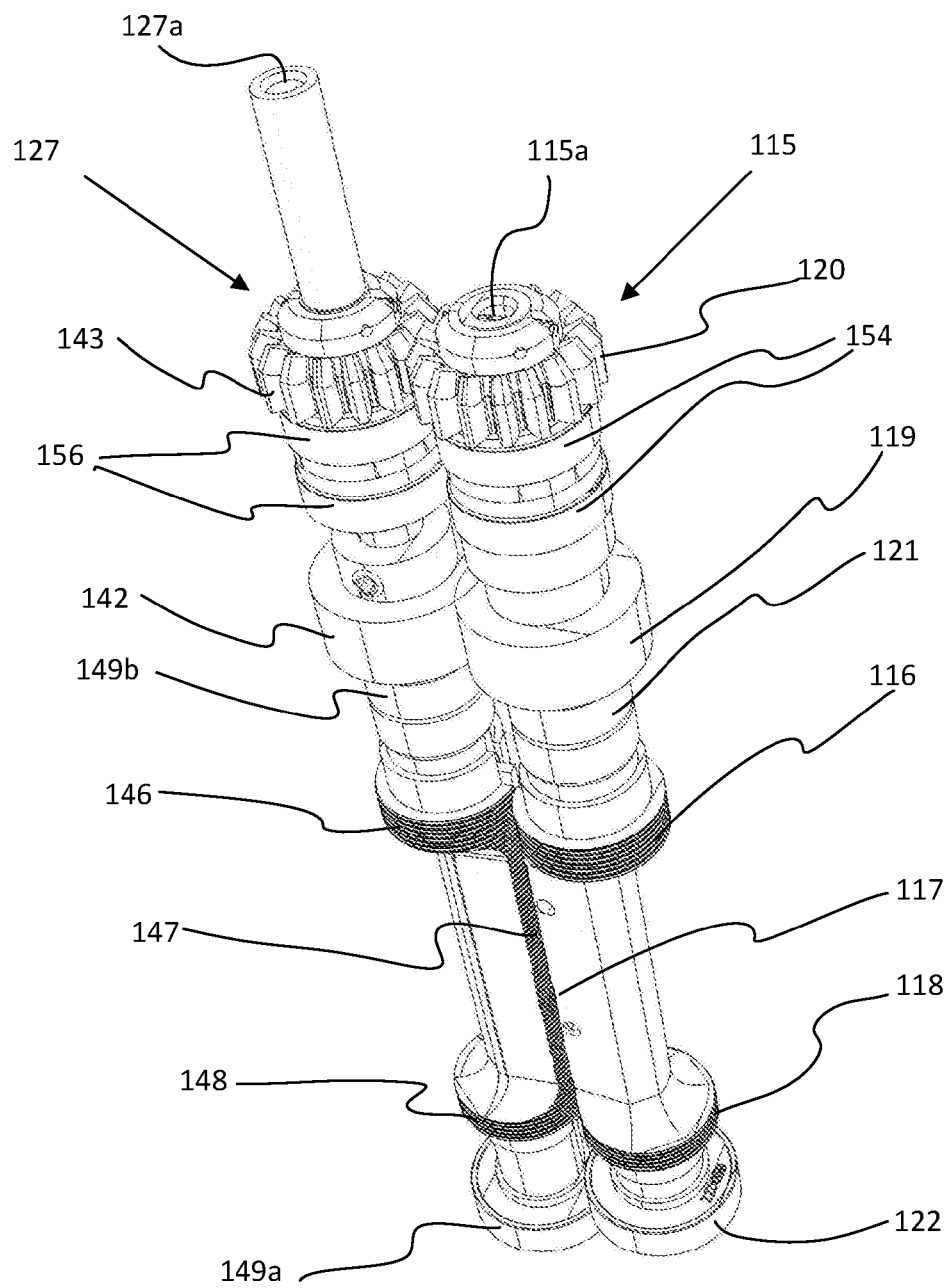
FIG. 31 is a perspective view of the heat roller of FIG. 26.

The conveyance rollers 111 and 113, as shown in FIG. 30, are supported opposite to mounting plate 107 at the bottom of the first holding part 104. One conveyance roller (the first conveyance roller 111), is rotatably installed in one end of the operating arm 112 that is rotatably supported at the bottom of the first holding part 104 with spindle 111a as a center. As for the other conveyance roller (second conveyance roller 113), a driven gear 110 is fixed to the rotating shaft of the other conveyance roller, and through the interlocking gears 114a and 114b, the second conveyance roller 113 can be rotated synchronously with the first conveyance roller 111. With the help of a spring (not shown) provided in the operating arm 112, the first conveyance roller 111 is biased towards the second conveyance roller 113. When operating arm 112 is rotated, the first conveyance roller 111 can be detached from the second conveyance roller 113, and can be used when setting, attaching or removing the packaging sheet S for maintenance or the like.

The tip of the second holding part 105, as shown in FIG. 29, is roughly U shape, and its inside is provided with a slot portion 105a. A bearing 122 mounted at the lower end of the fixed heat roller 115 is disposed in this slot portion 105a.

The fixed heat roller 115, as shown in FIG. 30, is in the shape of a long cylinder and can be formed, for example, by casting ductile cast iron. A heater (not shown) is provided in the center hole 115a of the fixed heat roller 115. The shape of the cross-section along the length direction of the fixed heat roller 115 is formed roughly in an I shape from the lower end to a predetermined location in the upper direction, and constitutes a sealing part comprised of a longitudinal sealer 116 and transverse sealer 117, and an auxiliary roller unit 118. The longitudinal sealer 116 is an outer circumferential surface of the cylinder disposed at one end of the fixed heat roller 115. The auxiliary roller unit 118 is provided at the other end of the fixed heat roller 115, and has the same shape as that of the longitudinal sealer 116. The transverse sealer 117 is an area (part of the outer circumference) of a predetermined width dimension connecting the longitudinal sealer 116 and auxiliary roller unit 118. A saw blade cross-section is formed by providing a plurality of slots along the circumference direction in each sealing part 116, 117 and auxiliary roller unit 118. With this, in addition to making it difficult to cause sliding between the longitudinal sealer 116 or transverse sealer 117 and packaging sheet S, seal unevenness is unlikely to occur as compared to contacting with the entire surface, and satisfactory sealing condition can be achieved. Further, a slot is formed in the center of the transverse sealer 117, and a cutting blade member (not shown) is disposed therein. The cutting blade member is for providing a cutting section in a broken line in the transversely sealed portions of the packaging sheet S.

In the upper part of the fixed heat roller 115, a main gear 119, sub-gear 120, bearing 121 and one pair of trolley electrodes 154 are respectively provided. The main gear 119 is configured of spur gear, and when the rotating shaft of a movable heat roller 127 (described later) is arranged in parallel, it will mesh with main gear 142. On the other hand, the sub-gear 120 has a configuration wherein a spur gear and a bevel gear are integrated, and meshes with the spur gear of the sub-gear 143 of the movable block 123, and when the movable block 123 is rotated, it will mesh with the bevel gear. A flange 155 supported by a spring is in a sliding contact with the trolley electrode 154 so that electric power can be supplied to a built-in heater (not shown). Also, a bearing 122 is provided at the bottom end of fixed heat roller 115. The fixed heat roller 115 is rotatably supported to the fixed block 102 by fitting the upper bearing 121 in the through-hole formed at the bottom of the first holding part 104, and disposing the lower bearing 122 in the slot portion 105a of the second holding part 105.

As shown in FIG. 26, power can be transmitted to the fixed heat roller 115 from a drive motor (not shown) via an intermediate gear member 150. In the intermediate gear member 150, a spur gear 152 that meshes with the main gear 119, and bevel gear 153 that meshes with the bevel gear provided in the rotating shaft of the drive motor are integrated to the rotating shaft 151. A triangular plate 102a is attached to the fixed block 102 for folding the packaging sheet S into a V shaped transverse cross-section along the length direction.

Figure 27:
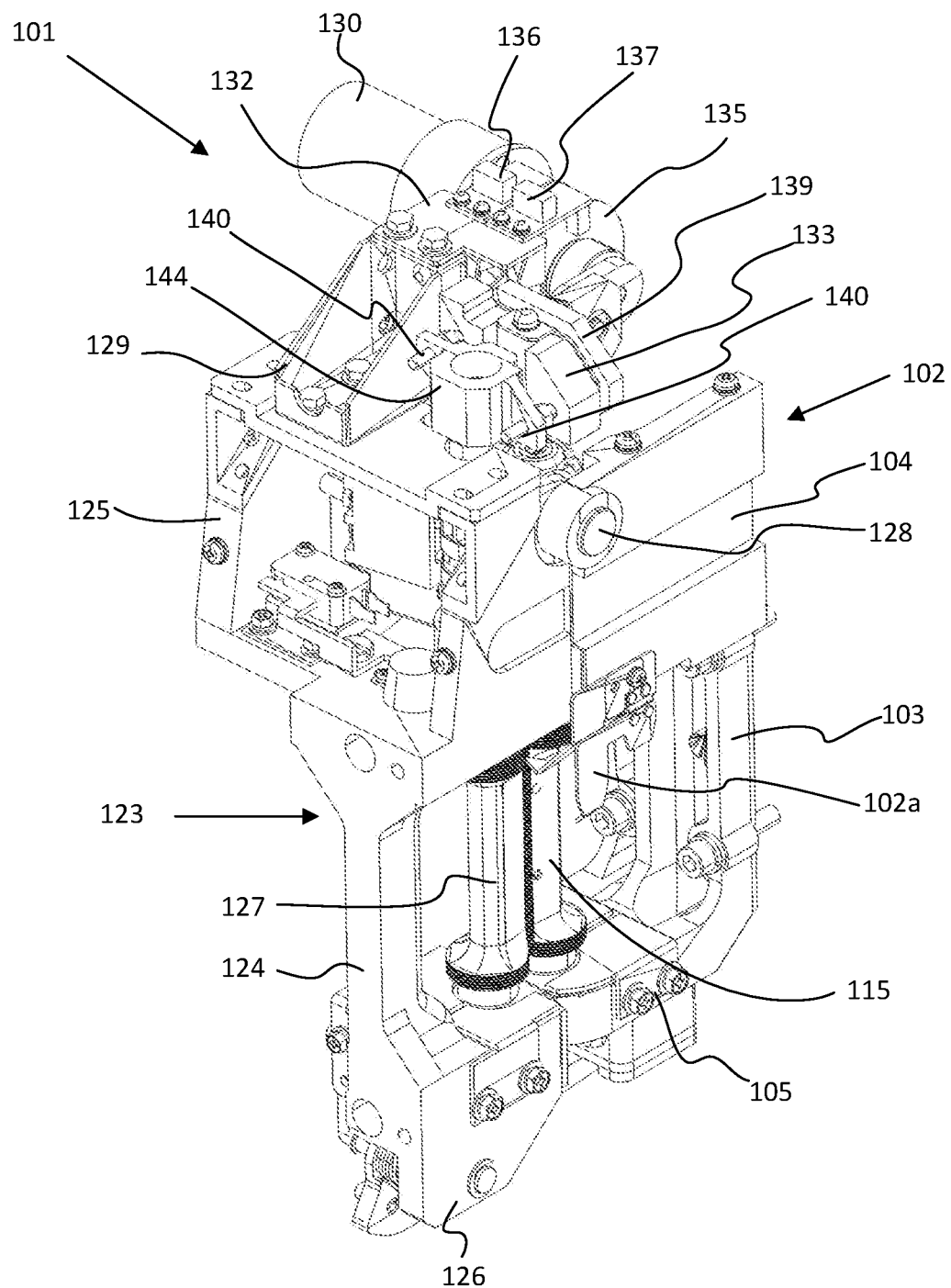
FIG. 27 is a perspective view of the heat sealing part of FIG. 26 as seen from a different angle.

The movable side block 123, as shown in FIG. 27, has the configuration almost similar to the fixed block 102, and configured from an attaching part 124, a first holding part 125 and a second holding part 126, and rotatably supports a movable heat roller 127.

Through-holes (not shown) are respectively provided in the corner on both side walls of the first holding part 125. Thereupon, a shaft member 128 is inserted through the holes and the through-holes 104a of the fixed block 102, and a movable block 123 is connected rotatably to the fixed block 102.

A fulcrum 129 is fixed in the upper part of both walls of the first holding part 125. A first mounting plate 131 to anchor a motor for rotation 130, a second mounting plate 132 to mount light sensors 136 and 137, and a guide member 133 are fixed respectively to the fulcrum 129.

In the middle of rotating shaft of the motor for rotation 130, two disks (first disk 134 and second disk 135) to be detected are mounted respectively in axially deviating positions. A notch (or opening) is provided in circumferentially deviating position of each of the disks 134 and 135. Each notch is formed such that the respective positions can be detected respectively by the light sensors (first light sensor 136 and second light sensor 137). At the position where the notch of the first disk 134 is detected by the first light sensor 136, the movable heat roller 127 is positioned at a sealing position, and at the position where the notch of the second disk 135 is detected by the second light sensor, the movable heat roller 127 moves to a retracted position.

One end of a connecting bar 138 is rotatably connected to the tip of the rotating shaft of the motor for rotation 130. At the other end of the connecting bar 138, the projecting part of a substantially T-shaped moving piece 139 is rotatably connected. A screw member 140 is mounted respectively at both ends of the pressing part of the moving piece 139.

The respective screw members 140 are inserted through the guide hole (not shown) provided in the guide member 133, and the tip section is inserted through the through-hole (not shown) of the pressing accepting member 144 (described later). In the middle of each screw member 140, a nut 141 is screwed between the guide member 133 and pressing accepting member 144. This nut 141, when the connecting bar 138 is moved by driving the motor for rotation 130, functions as an action point for rotating the movable heat roller 127 by contacting with the pressing accepting member 144. Therefore, if the screwing position of the nut 141 is varied, the extent of rotation of the movable heat roller 127 can be adjusted.

The movable heat roller 127 is rotatably supported by the first holding part 104 and second holding part 105 of the movable block 123. The movable heat roller 127, as shown in FIG. 30, has a configuration similar to that of the above-mentioned fixed heat roller 115. Namely, the movable heat roller 127 is comprised of a built-in heater (not shown) in the center hole 127a, a longitudinal sealer 146, a transverse sealer 147, auxiliary roller unit 148, bearings 149a, 149b and trolley electrode 156. The movable heat roller 127 can rotate with the contacting position of auxiliary roller units 118 and 148 as fulcrum, in a space between the movable heat roller 127 and the fixed heat roller 115, to a sealing position wherein the longitudinal sealers 116 and 146 contact each other through the packaging sheet S and to a retracted position where they are detached. However, one end where a main gear 142 and sub-gear 143 are disposed is further extended, and a pressing accepting member 144 is mounted therein.

Figure 32:
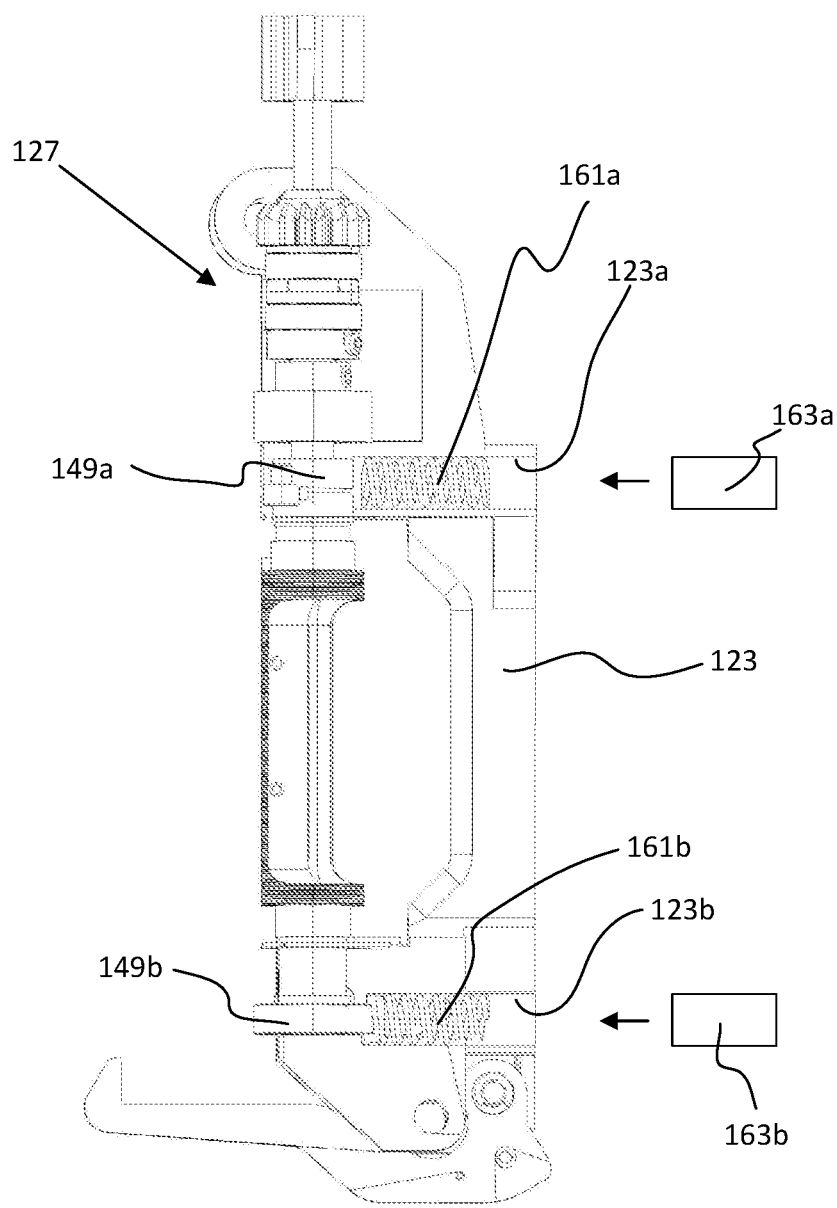
FIG. 32 is a partial cross-sectional view of the movable block of FIG. 26.

The movable heat roller 127, as shown in FIG. 32, is biased towards the fixed heat roller 115 as the bearings 149a and 149b are pressed by a first coil spring 161a and a second coil spring 161b (bias members) that are provided in the movable block 123. The first coil spring 161a and the second coil spring 161b are disposed inside the through-holes 123a and 123b respectively formed in the movable block 123. Female threading is provided in the inner surface of the through-holes 123a and 123b, and cylinders 163a and 163b having male threading in the outer periphery are respectively screwed to there. By adjusting the screwing positions of the cylinders 163a and 163b, pressing force of the first coil spring 161a and the second coil spring 163b can be changed, and the biasing force created by the movable heat roller 127 can be adjusted. Such adjustment of biasing force is done at the time of initial setup or at the time of maintenance so that the holding force between the longitudinal sealers 116 as well as 146 and transverse sealers 117 as well as 147 can be adjusted to achieve a proper sealing of the packaging sheet S.

Figure 28:
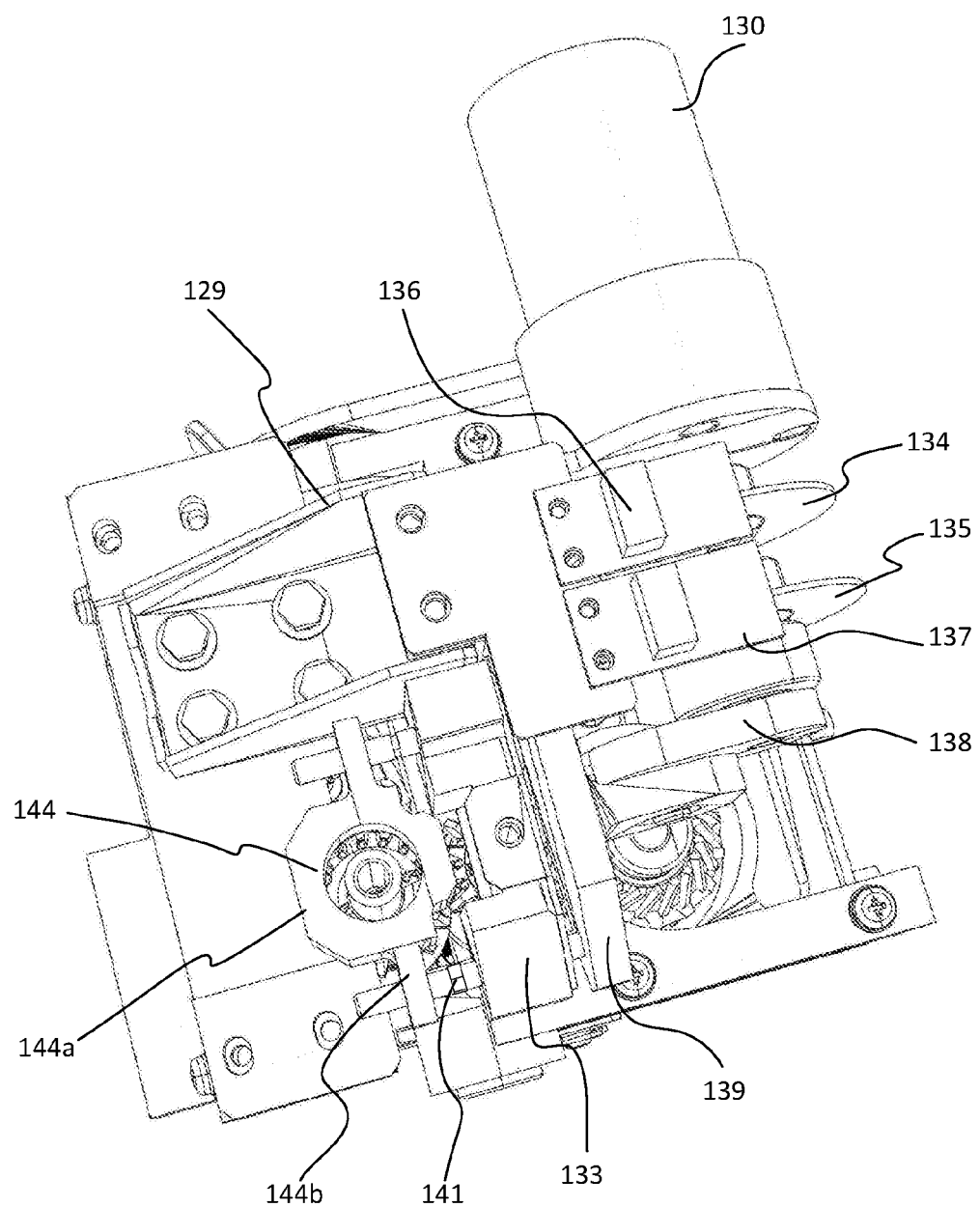
FIG. 28 is a perspective view of the heat sealing part of FIG. 26 as seen from top.

The pressing accepting member 144, as shown in FIG. 28, is comprised of cylindrical section 144a locking with one end of the movable heat roller 127, and one pair of arms 144b extending to both sides therefrom. Through-holes (not shown) are formed in both arms 144b, and the tip of the screw member 140 is inserted in there.

The movable block 123 of the above configuration, as shown in FIG. 28, is connected to the fixed block 102 by locking the hook member 154 provided rotatably in the second holding part 126 with the second holding part 105 of the fixed block 102. At maintenance and the like, by releasing the locking state of the hook member 154, the movable block 123 can be rotated and detached from the fixed block 102.

In a movable block 123 of the above configuration, as shown in FIG. 26, all of the mechanisms (for example, motor for rotation 130, connecting bar 138, screw member 140, pressing accepting member 144, etc.) for rotating the movable heat roller 127 can be disposed on the heat sealing part 101 that is mounted inside the housing 6. Since the space on the heat sealing part 101 was originally a dead space, by effectively utilizing this dead space, it is possible to prevent an increase in the size of the apparatus. If the mechanisms are disposed in front of the heat sealing part 101 such as the support member 51 shown in the first embodiment, an extra space in the housing 6 may be required in the front side of the medicine packing apparatus 1, but there is no need for this concern. Since there are no items to be disposed in front of the heat sealing part 101, it becomes possible to adjust the biasing force of movable heat roller 127 with a simple configuration, which was difficult in the above-mentioned embodiment.

Figure 33:
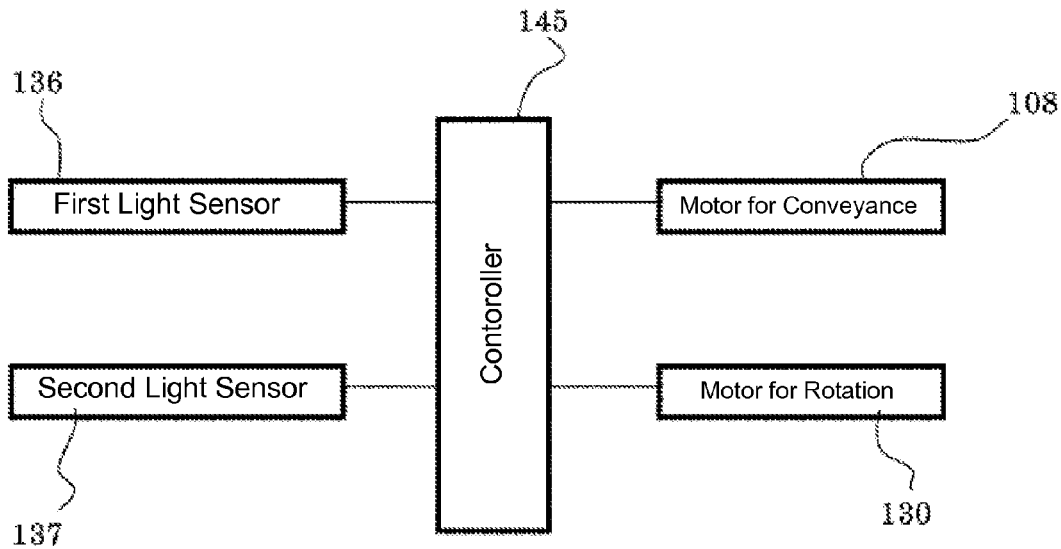
FIG. 33 is a block diagram of the medicine packing apparatus according to the second embodiment.

The input signals from the above-mentioned sensors 136 and 137 etc., as shown in FIG. 33, are fed to the controller 145. The controller 145 executes the packaging process by driving and controlling the motors 108 and 130 etc. based on the input signals.

Here, the operation of the heat sealing part 101 of the above configuration will be explained. Basic operations are same as those of the embodiment mentioned above (see flowchart and related explanations in FIG. 7), but differs only with regard to the configuration of moving the movable heat roller 127 to a retracted position. That is, in case the transverse sealing position of the transverse sealer 117 is changed based on the quantity of the medicine to be packaged, rotation of the heat rollers 115 and 127, and conveyance rollers 111 and 113 are stopped (step S4), and the motor for rotation 130 is driven (step S5). The motor for rotation 130 continues to be driven until the notch of the second disk 135 is detected by the second light sensor 137. With this, the movable heat roller 127 rotates to the retracted position from the sealing position. Because the movable heat roller 127 simply rotates with the contact section of the auxiliary roller units 118 and 148 as a fulcrum, the operation is smooth and stable although the configuration is simple as compared to the case of parallely moving the entire unit. Thereupon, by similarly idling both heat rollers 115 and 127 in a state wherein the movable heat roller 127 is moved to the retracted position, the position of transverse sealer 117 is adjusted (steps S6 and S7). Subsequently, by driving the motor for rotation 130, the movable heat roller 127 is returned to the original sealing position (step S8), and sealing is resumed (step S9).

Here, because of an integral structure in which the same material is used for the fixed heat roller 115 and the movable heat roller 127, a difference in the heating temperature is not likely to occur between the longitudinal sealer 116 and transverse sealer 117. In other words, uniform heating of the packaging sheet S becomes possible regardless of vertical sealing position or transverse sealing position, and sealing unevenness does not occur. Therefore, despite of using a configuration of detaching the movable heat roller 127 from the packaging sheet S, it becomes possible to provide an excellent sealing condition for the packaging sheet S.

Furthermore, in the embodiment mentioned above, a configuration was provided in which the movable heat roller 127 is rotated by resisting the biasing force of the first coil spring 161a to detach the movable heat roller 127 from the fixed heat roller 115, but the following configuration is also possible.

Figure 34:
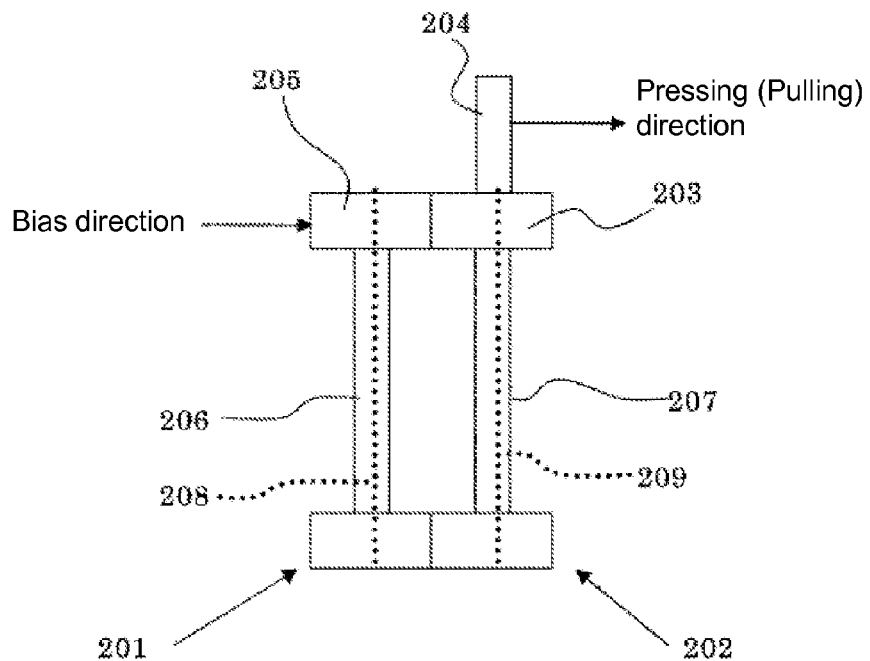
FIG. 34 is a schematic explanatory diagram of a heat roller according to another embodiment.

Namely, as shown in FIG. 34, the heat rollers 115 and 127 are configured from a first heat roller 201 and a second heat roller 202 that are rotatable. Then, although biasing of the first heat roller 201 towards the second heat roller 202 by coil spring (not shown) is similar to the embodiment described above, it differs with regard to pulling the upper part of the second heat roller 202 so as to rotate to detach from the first heat roller 201. The position of pulling the second heat roller 202 may be the shaft 204 projecting from the longitudinal sealer 203. As a mechanism for pulling the shaft 204, a mechanism of the second embodiment for rotating the movable heat roller 127, or a known cam mechanism or a link mechanism may be used.

Here, since the first heat roller 201 is biased towards the second heat roller 202 by a coil spring, if the second heat roller 202 is pulled and moved, there is a risk of the first heat roller 201 losing the support of the second heat roller 202 and moving beyond the position of abutment. Therefore, it is preferable to provide a stopper (not shown) so that the first heat roller 201 does not move more than necessary. The stopper, for example, may be provided in the movable block 123, and located between the longitudinal sealer 206 of the first heat roller 201 and the longitudinal sealer 207 of the second heat roller 202 (described later).

Figure 35:
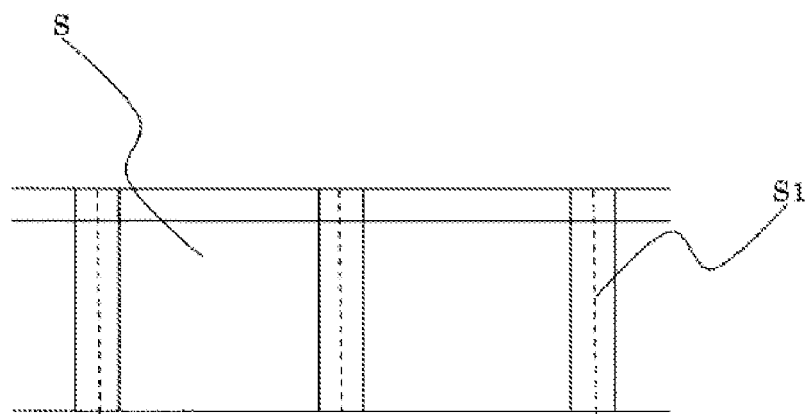
FIG. 35 is a plane view of the packaging sheet formed by the heat roller of FIG. 34.

In addition, in the heat rollers 115, 127 and 201, 202, the longitudinal sealers 116, 146 and 205, 203 and transverse sealers 117, 147 and 206, 207 are integrally formed. Therefore, by providing continuous cutting blades 208 and 209 in both sealing parts, it becomes possible to form a perforation S1 that cuts across the packaging sheet S in the width direction as shown in FIG. 35. Further, it becomes possible to minimize the temperature difference between the longitudinal sealers 116,146 and 205, 203, and transverse sealers 117, 147 and 206, 207. Consequently, it becomes possible to use an inexpensive material with a small difference between the welding temperature (sealable temperature) and the melting temperature for a packing sheet S, and to increase options for the material. In particular, a material having excellent moisture resistance suitable for packaging of medicines, which could not be used in the past, can be used. Specifically, cello poly (made from cellophane and polyethylene) having a moisture permeability of 15 g/m$^2$·24 h (room temperature 30° C., humidity 90%) was conventionally used, however, currently, it became possible to use a newly developed material having a moisture permeability of 10 g/m$^2$·24 h (room temperature 30° C., humidity 90%).

Further, as for the heat rollers 115, 127 and 201, 202, it is preferable to detach them from the packaging sheet S when the packaging operation is not being performed. With this, it becomes possible to prevent the occurrence of problems such as the packaging sheet S becoming heated and melting, or adhering to the heat rollers 115, 127 and 201, 202 when the packaging operation is not happening.

While the principles of the disclosure have been described above in connection with specific apparatuses and methods, it is to be clearly understood that this description is made only by way of example and not as limitation on the scope of the disclosure.

The invention claimed is:

1. A medicine packing apparatus, comprising:
   a sheet feeder for feeding a packaging sheet, which is folded along a longitudinal direction of the packaging sheet and oriented so that the fold faces downwardly;
   a medicine supplier for supplying a medicine onto the packaging sheet from an upward direction;
   a pair of sealers for letting the packaging sheet between the sealers by rotating and for heat-sealing portions of the packaging sheet to pack the medicine in the packaging sheet, wherein each of the sealers comprises:
      a longitudinal sealer for sealing an edge portion of the packaging sheet in the longitudinal direction, the edge portion being opposed to the fold of the packaging sheet, and
      a transverse sealer for sealing portions of the packaging sheet in a transverse direction of the packaging sheet so that the transversely sealed portions are spaced apart from each other by a predetermined width,
      wherein the longitudinal sealer and the transverse sealer are integrated in the sealer as one body;
   a support member for supporting at least one of the sealers so that at least the longitudinal sealer of said at least one of the sealers is attachable to and detachable from the packaging sheet;
   a conveyance roller provided downstream of a conveying direction from the pair of sealers, and for holding and conveying the packaging sheet; and
   a controller for controlling the rotations of the sealers and the conveyance roller, as well as the movement of said at least one of the sealers,
   wherein one of the pair of sealers is fixed to tilt on a fulcrum relative to the other of the pair of sealers, such that a first portion of the one of the pair of sealers is movable away from the other of the pair of sealers while a second portion of the one of the pair of sealers remains in contact with the other of the pair of sealers;
   wherein the controller adjusts the width between the transversely sealed portions by arranging at least the longitudinal sealer of said at least one of the sealers to rotate at a state detached from the packaging sheet; and,
   wherein the controller stops rotation of the conveyance roller when the at least one of the sealers are in the state detached from the packaging sheet.

2. The medicine packing apparatus of claim 1, wherein the support member movably supports said at least one of the sealers through both end portions of said at least one of the sealers.

3. The medicine packing apparatus of claim 1, wherein the support member rotatably supports one end portion of said at least one of the sealers and movably supports the other end portion of said at least one of the sealers so that said at least one of the sealers can rotate around said one end portion.

4. The medicine packing apparatus of claim 1, wherein the controller selects a rotational direction of said at least one of the sealers to rotate at the state where at least the longitudinal sealer of said at least one of the sealers is detached from the packaging sheet.

5. The medicine packing apparatus of claim 1, wherein the controller instructs the sheet feeder to stop feeding the packaging sheet when at least the longitudinal sealer of said at least one of the sealers detaches from the packaging sheet.

6. The medicine packing apparatus of claim 1, wherein the controller lets the sheet feeder to keep feeding the packaging sheet when at least the longitudinal sealer of said at least one of the sealers detaches from the packaging sheet; and
   wherein a length by which the packaging sheet is fed while at least the longitudinal sealer of said at least one of the sealers is detached from the packaging sheet is within a range where the longitudinal sealers can seal the edge portion of the packaging sheet seamlessly.

7. The medicine packing apparatus of claim 6, wherein the controller sets the feeding speed of the packaging sheet slower while at least the longitudinal sealer of said at least one of the sealers is detached from the packaging sheet than while the longitudinal sealers are sealing the edge portion of the packaging sheet.

8. The medicine packing apparatus of claim 6, wherein the controller makes said at least one of the sealers rotate faster while at least the longitudinal sealer of said at least one of the sealers is detached from the packaging sheet than while the longitudinal sealers are sealing the edge portion of the packaging sheet.

9. The medicine packing apparatus of claim 6, wherein the sealers are movable in the feeding direction of the packaging sheet;
   wherein the controller makes the sealers move from a default longitudinal position in the feeding direction of the packaging sheet after at least the longitudinal sealer of said at least one of the sealers detaches from the packaging sheet;
   wherein the controller makes at least the longitudinal sealer of said at least one of the sealers attach to the packaging sheet after the sealers move from the default longitudinal position in the feeding direction of the packaging sheet;
   wherein the controller makes the sealers return to the default longitudinal position after at least the longitudinal sealer of said at least one of the sealers attaches to the packaging sheet; and
   wherein the controller makes the sealers rotate faster while the sealers are returning to the default longitudinal position than while the longitudinal sealers of the sealers are sealing the portion of the packaging sheet at the default longitudinal position.

10. The medicine packing apparatus of claim 1, further comprising a moving mechanism for moving said at least one of the sealers so that at least the longitudinal sealer of said at least one of the sealers moves between a sealing position where said longitudinal sealer is attached to the packaging sheet and a retracted position where said longitudinal sealer is detached from the packaging sheet.

11. The medicine packing apparatus of claim 10, wherein said at least one of the sealers is rotatable around one end portion of said at least one of the sealers;
wherein the moving mechanism presses the other end portion of said at least one of the sealers to rotate said at least one of the sealers so that at least the longitudinal sealer of said at least one of the sealers moves from the sealing position to the retracted position.

12. The medicine packing apparatus of claim 1, wherein each of the sealers has an approximately cylindrical shape and is formed as one body from one material.

13. The medicine packing apparatus of claim 10, wherein the other of the sealers comprises a fixed heat roller whose position is fixed;
wherein said one of the sealers comprises a movable heat roller, whose orientation is parallel to an orientation of the fixed heat roller;
wherein the movable heat roller is rotatable around one end portion of the movable heat roller, and the movable heat roller is attachable to and detachable from the fixed heat roller via the packaging sheet by the rotation of the movable heat roller;
wherein the moving mechanism comprises:
 a motor;
 a connecting bar, whose one end is rotatably coupled to a position eccentric to the rotational axis of the motor;
 a moving piece rotatably coupled to the other end of the connecting bar; and
 a pressing member coupled to the other end portion of the movable heat roller, the pressing member pressing the other end portion of the movable heat roller by a force transmitted by the moving piece.

14. The medicine packing apparatus of claim 10, further comprising a bias member for biasing said one of the sealers toward the other of the sealers;
wherein a bias force of the bias member is adjustable.

15. The medicine packing apparatus of claim 14, further comprising:
a fixed block for rotatably supporting the other of the sealers; and
a movable block for rotatably supporting said one of the sealers, the movable block rotatably coupled to the fixed block;
wherein the moving mechanism is mounted on the movable block.

16. The medicine packing apparatus of claim 10, further comprising a bias member for biasing said one of the sealers toward the other of the sealers;
wherein the moving mechanism moves said one of the sealers between the sealing position and the retracted position.

17. The medicine packing apparatus of claim 16, further comprising a stopper for preventing the other of the sealers from moving when the moving mechanism moves said one of the sealers to the retracted position.

18. A medicine packing apparatus, comprising:
a sheet feeder for feeding a packaging sheet;
a medicine supplier for supplying a medicine onto the packaging sheet;
a first longitudinal sealer and a second longitudinal sealer for coordinately sealing a portion of the packaging sheet in a longitudinal direction of the packaging sheet;
a first transverse sealer and a second transverse sealer for coordinately sealing portions of the packaging sheet in a transverse direction of the packaging sheet so that the transversely sealed portions are spaced apart from each other,
 wherein the first longitudinal sealer and the first transverse sealer constitute a first body so that the first longitudinal sealer and the first transverse sealer rotate together and the second longitudinal sealer and the second transverse sealer constitute a second body so that the second longitudinal sealer and the second transverse sealer rotate together; and,
 wherein the first body is tiltably fixed relative to the second body, such that a first portion of the first body is movable away from the second body while a second portion of the first body remains in contact with said second body;
a support member for supporting the first body so that the first longitudinal sealer is attachable to and detachable from the packaging sheet;
a conveyance roller provided downstream of a conveying direction from the first and second longitudinal sealer and the first and second transverse sealer, and for holding and conveying the packaging sheet; and
a controller for controlling the rotations of the sealers and the conveyance roller, as well as the attachment and detachment of the first longitudinal sealer,
wherein the controller arranges the first transverse sealer to rotate at a state where the first longitudinal sealer is detached from the packaging sheet to adjust the width between the transversely sealed portions; and,
wherein the controller stops rotation of the conveyance roller when the first longitudinal sealer is detached.

* * * * *